United States Patent [19]

Furusawa et al.

[11] Patent Number: 4,658,676
[45] Date of Patent: Apr. 21, 1987

[54] TRANSMISSION CONTROL SYSTEM FOR AUTOMATIC TRANSMISSION

[75] Inventors: Choji Furusawa, Okazaki; Toshiaki Ishiguro, Nagoya, both of Japan

[73] Assignee: Aisin Seiki Kabushiki Kaisha, Kariya, Japan

[21] Appl. No.: 623,034

[22] Filed: Jun. 21, 1984

[30] Foreign Application Priority Data

Jun. 22, 1983 [JP] Japan ................. 58-112358

[51] Int. Cl.⁴ .............. B60K 41/06; G06F 15/20
[52] U.S. Cl. ............................ 74/866; 364/424.1
[58] Field of Search ............... 74/866, 865, 864; 364/424.1

[56] References Cited

U.S. PATENT DOCUMENTS

| | | | |
|---|---|---|---|
| 3,667,325 | 6/1972 | Ito et al. | 74/866 |
| 4,393,467 | 7/1983 | Miki et al. | 364/424.1 |
| 4,499,542 | 2/1985 | Hamajima et al. | 74/866 X |

FOREIGN PATENT DOCUMENTS

| | | | |
|---|---|---|---|
| 56-35858 | 8/1981 | Japan . | |
| 160658 | 9/1983 | Japan | 364/424.1 |
| 221051 | 12/1983 | Japan | 364/424.1 |
| 214051 | 12/1983 | Japan | 364/424.1 |

Primary Examiner—Rodney H. Bonck
Attorney, Agent, or Firm—Oblon, Fisher, Spivak, McClelland & Maier

[57] ABSTRACT

A transmission control system for automatic transmission having a mechanism for detecting the engine condition, the vehicle speed and the vehicle load and a control mechanism for automatically calculating and setting an appropriate gear ratio of the transmission basing upon the detected values. The control mechanism is so designed that the judgment on whether or not the start at a high speed gear ratio is allowable can be made before the vehicle stops, and the setting of the gear ratio at the time of vehicle stop is made automatically to a high speed gear ratio or a low speed gear ratio according to the above judgment.

2 Claims, 50 Drawing Figures

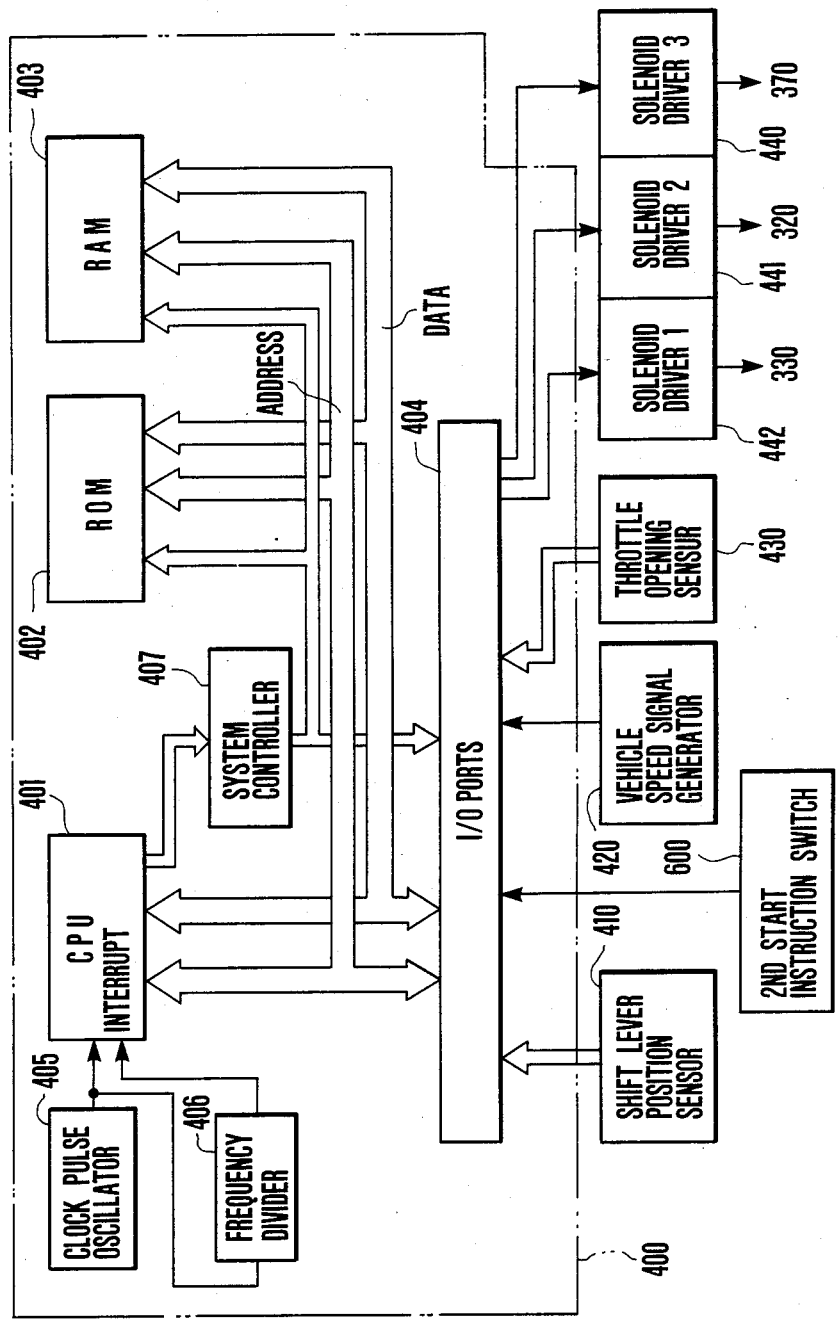
F I G. 3

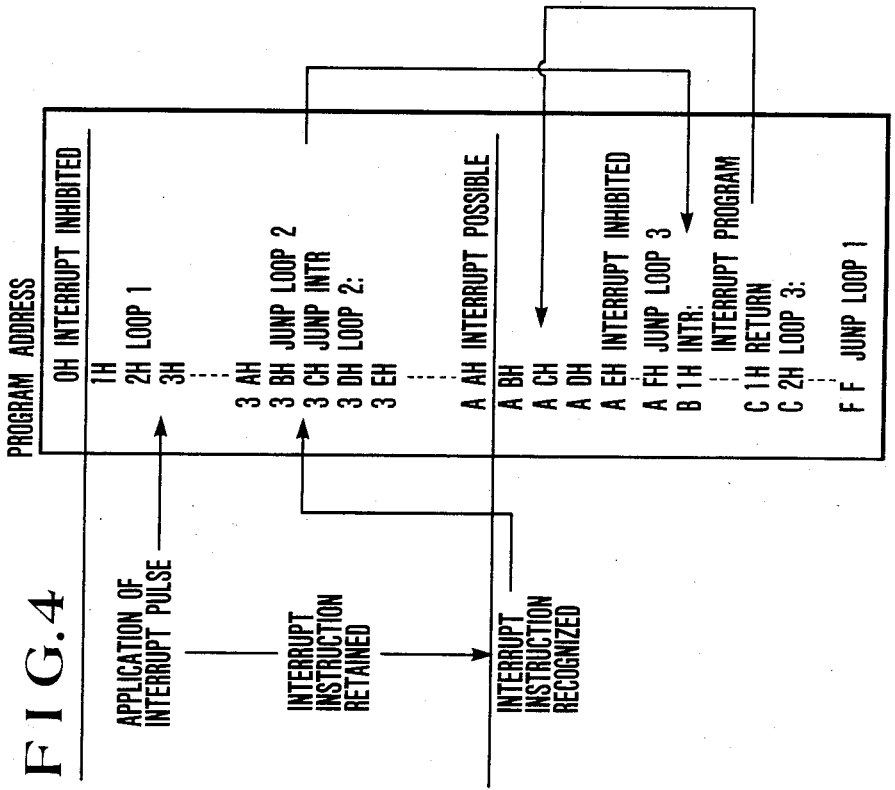

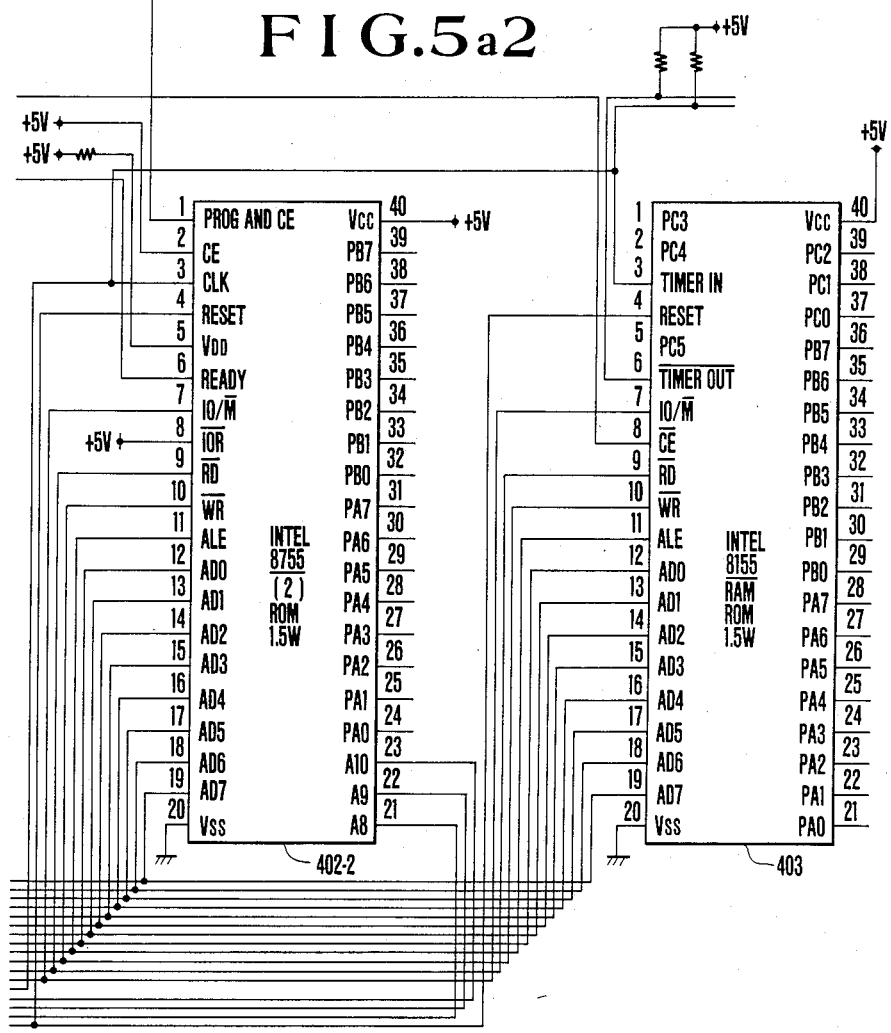

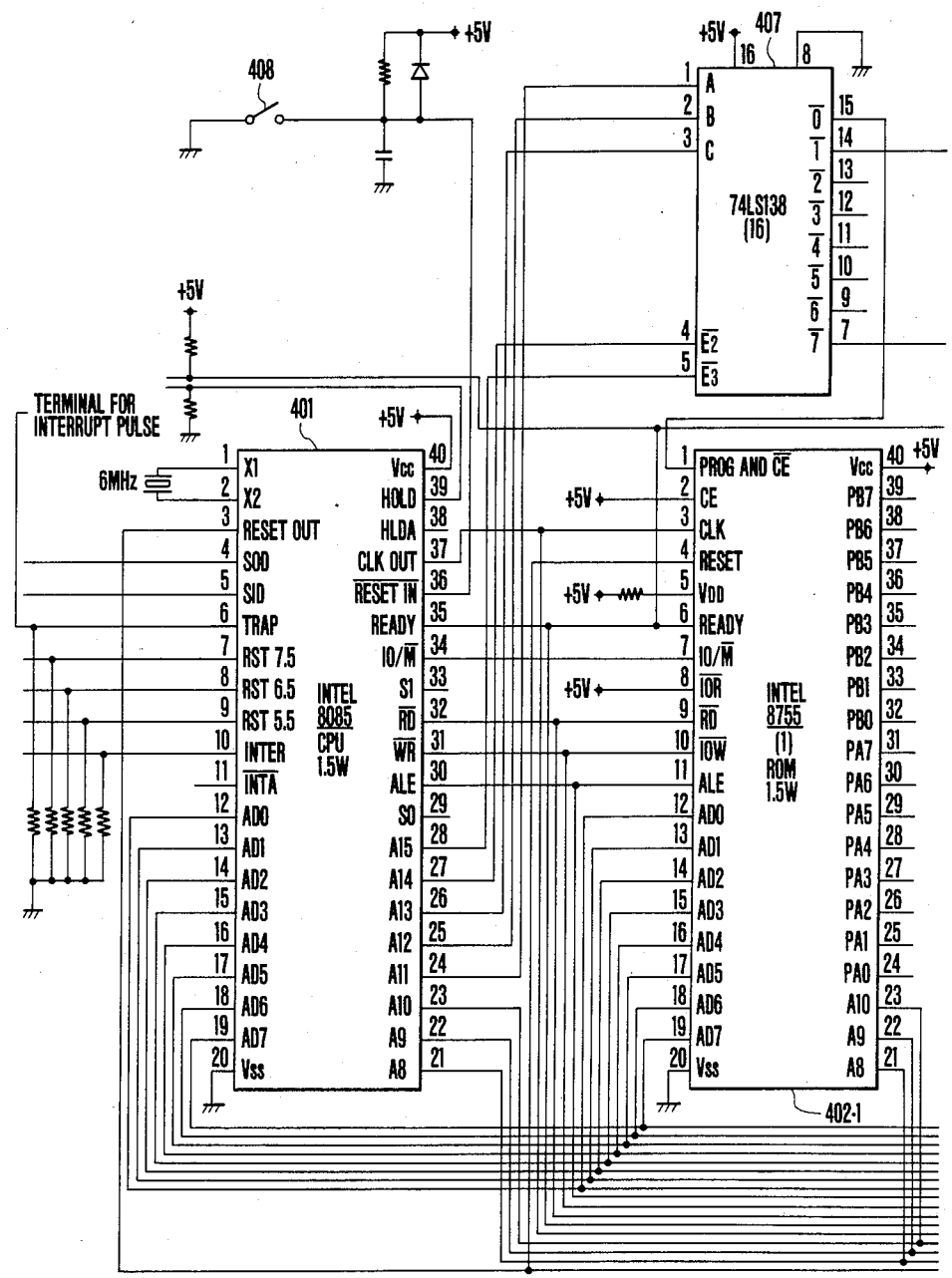
FIG. 5a1

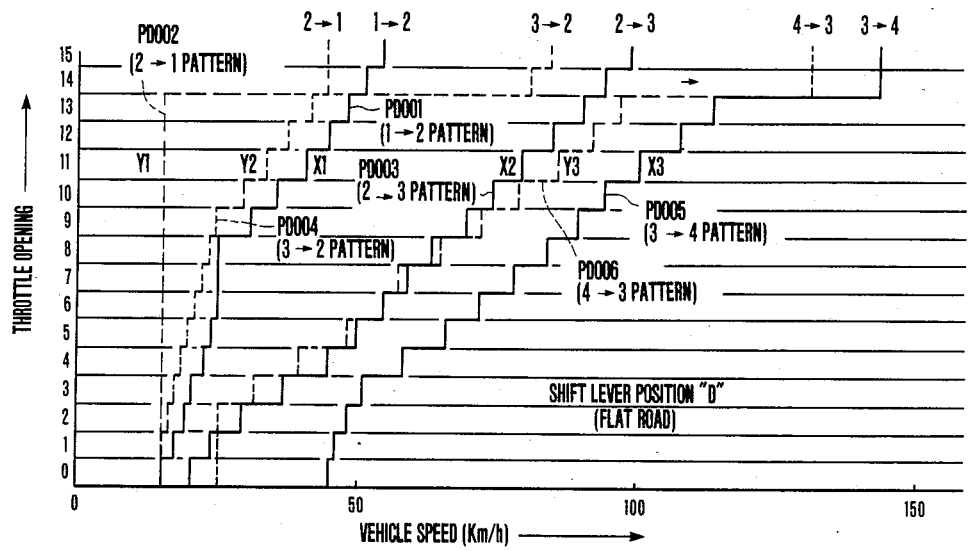
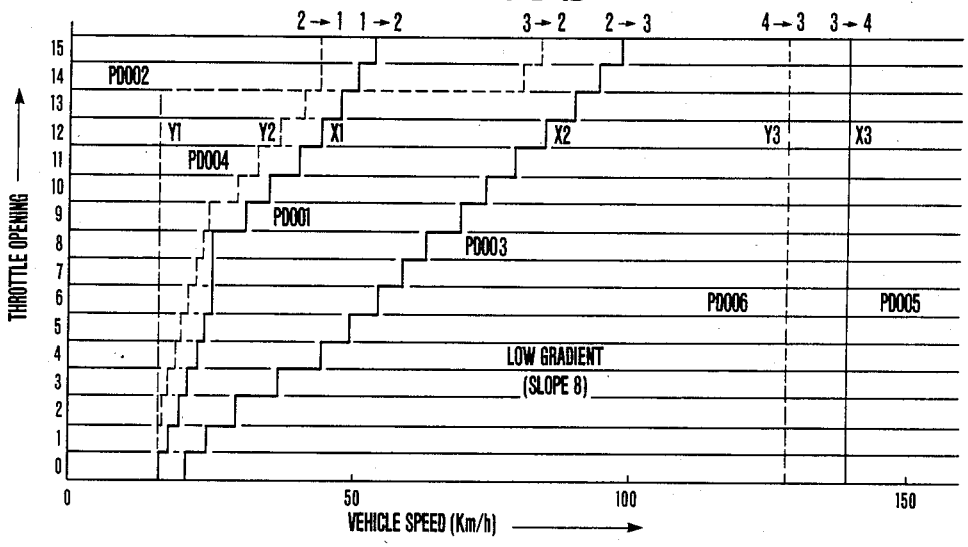

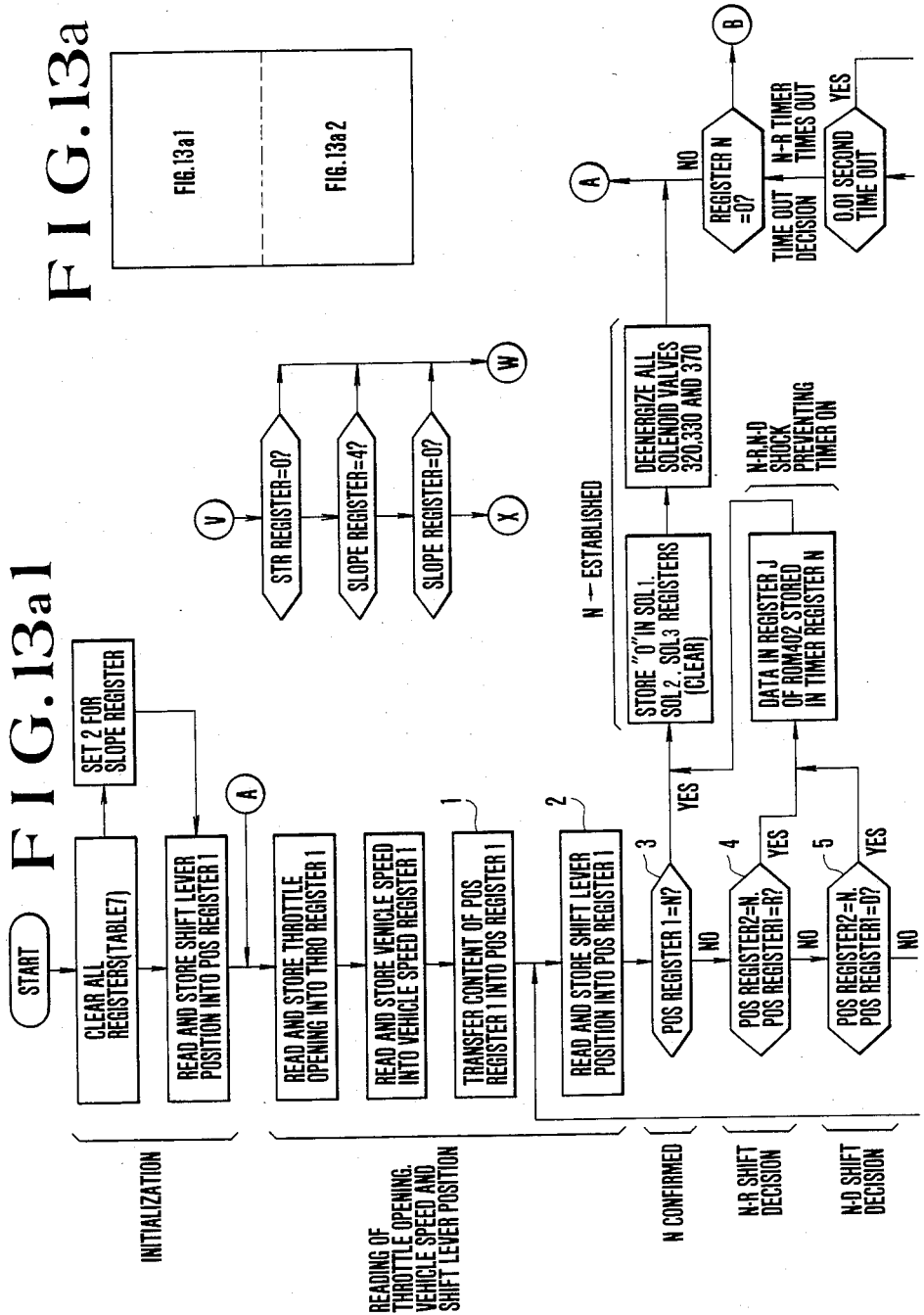

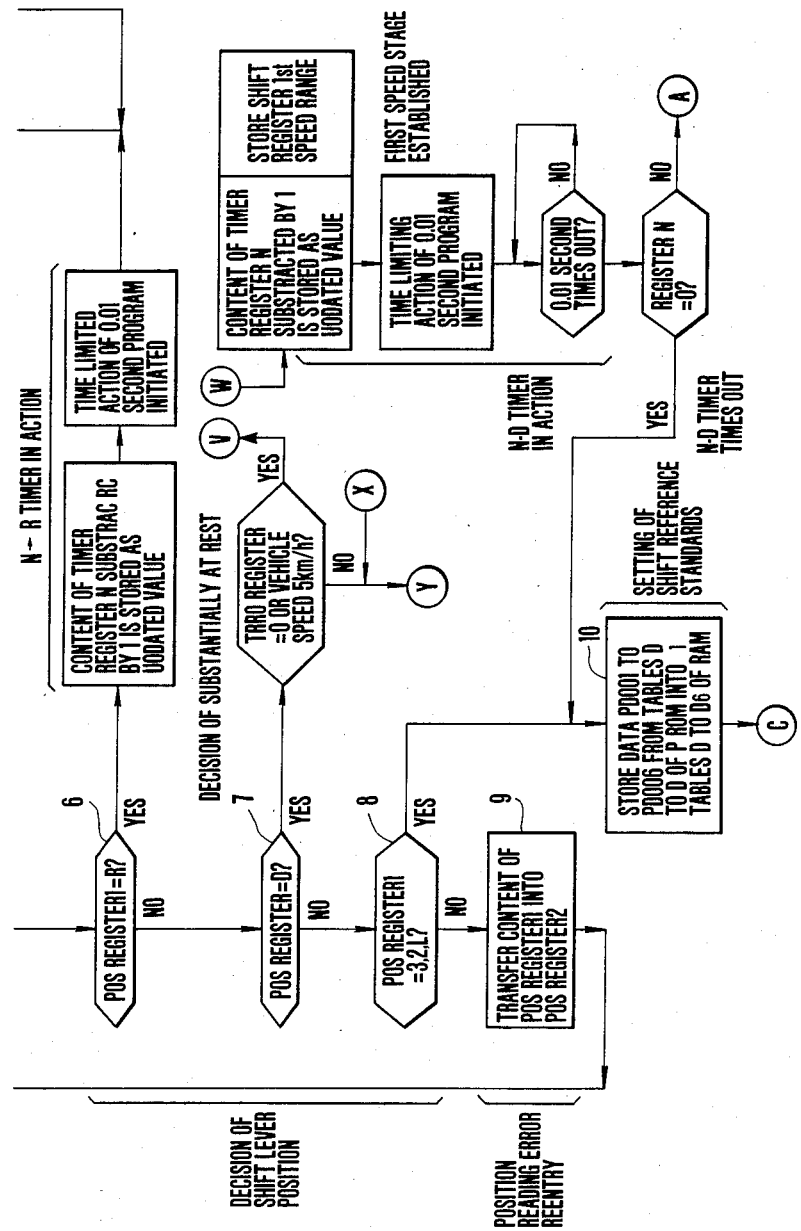
FIG. 13a2

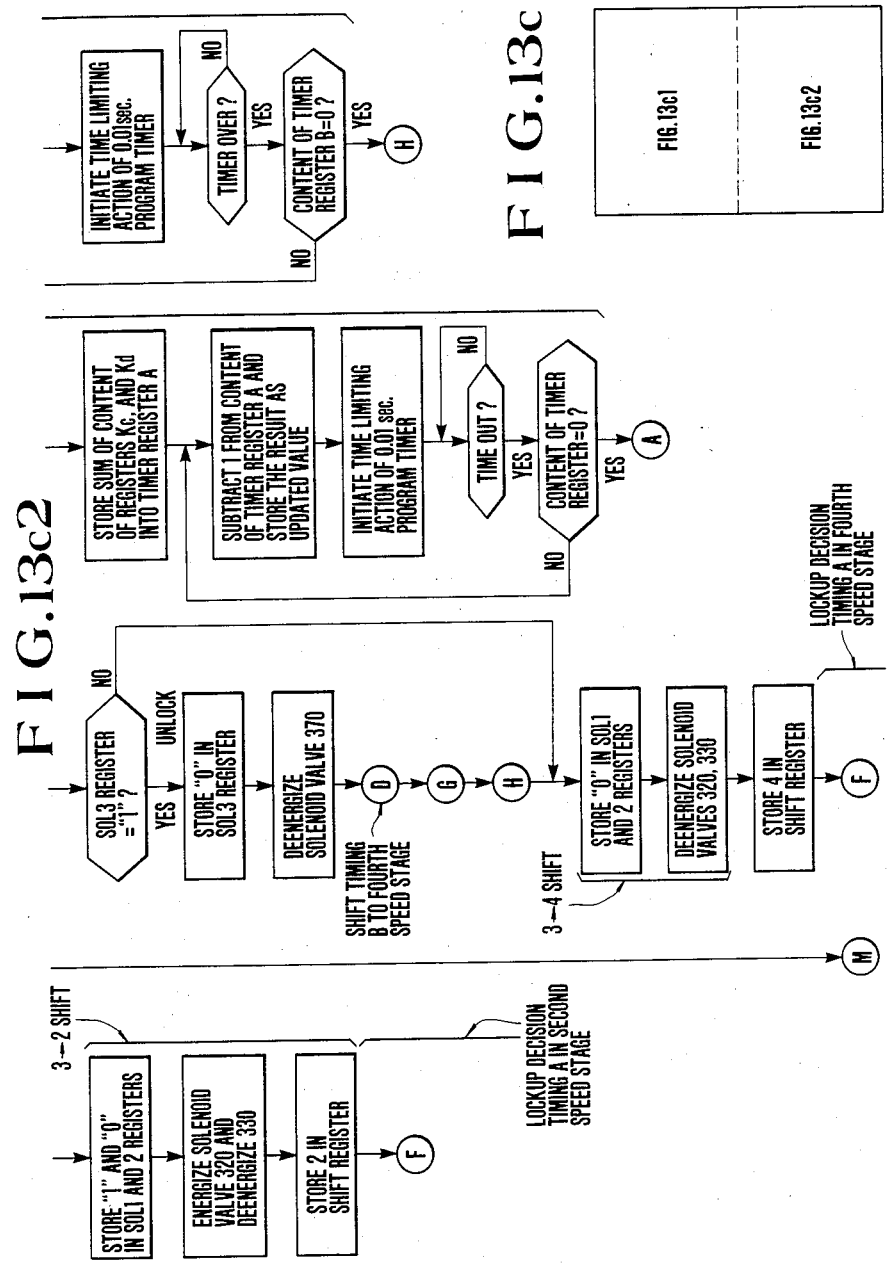

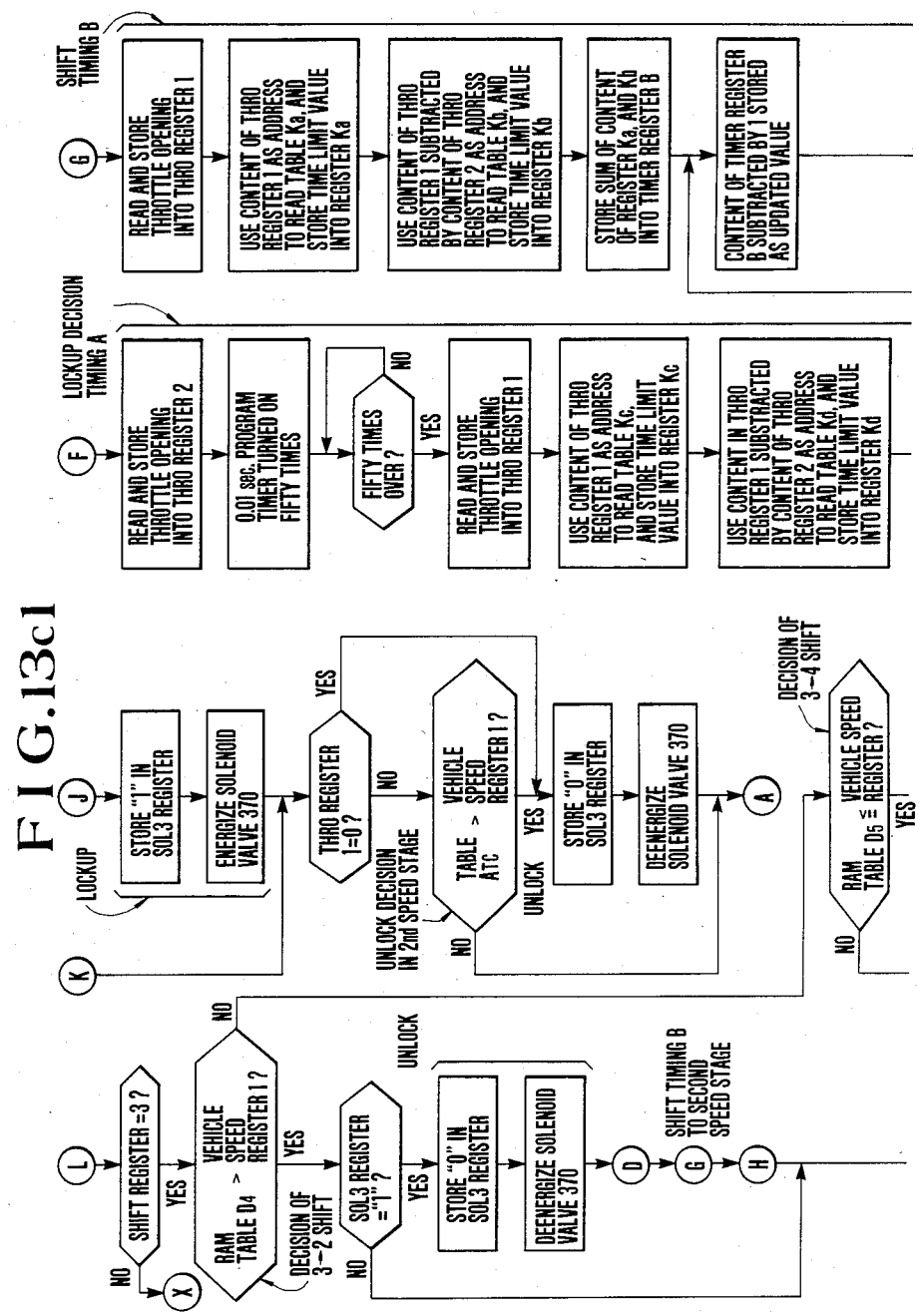

TRANSMISSION CONTROL SYSTEM FOR AUTOMATIC TRANSMISSION

BACKGROUND OF THE INVENTION

1. Field of the Invention

The present invention relates to a speed change control system for an automatic transmission, particularly a transmission control system that sets the gear ratio of the automatic transmission to a gear ratio that matches engine operation conditions, vehicle speed and load of the vehicle

2. Prior Art of the Invention

In the conventional automatic transmission which is electronically controlled, for example, in the transmission disclosed in the Japanese Laid-open Patent Publication No. 35858/1980 (Patent Application No. 11192/1979), the gear ratio is set by the combination of the opening and closing of a plurality of solenoid valves in the hydraulic circuit which are caused to be opened or closed by the electronic control system connected to the torque converter with a direct-coupled clutch. The electronic control system measures the load of the vehicle from the engine operation condition (the opening of the throttle in the case of the embodiment of the invention), vehicle speed and the position of the shift lever, while the vehicle is running. Then the system corrects the stored data for the judgment of the gear ratio according to the load of vehicle, compares the detected value with the corrected data to calculate the intended gear ratio, and sets the automatic transmission to the intended gear ratio to control the speed change. Furthermore, said electronic control system enables the transmission to be locked up at any gear ratio, instead of locking up the transmission at a specific high speed gear ratio such as 3rd gear or overdrive. Thus, the transmission is set in a torque converter condition to prevent lowering of the power performance in case where the speed change performance of the torque converter is effective, and is locked up in case where the speed change performance of the torque converter is not effective. Such lockup control is applied to each speed change step, thereby extending the range of the lockup and enabling a reduction of fuel consumption.

On the other hand, almost all conventional automatic transmissions are designed for starting at a low speed (first gear). However, starting at a high speed (e.g. 2nd speed) is allowable under some condition of the load of the vehicle (including the change in the load in climbing). Therefore, some automatic transmissions are so designed as to allow starting with a high gear ratio, as it allows for fast acceleration, the elimination of the shock occurring at the time of the shift from the low-speed gear to high-speed gear and the reduction of fuel consumption. But, with this type of automatic transmission, it is necessary for the driver to select the range exclusive for high-speed starting by operating the shift lever. In this case, the transmission is held at the high speed stage by changing the hydraulic pressure through the manual valve of the automatic transmission operated by the shift lever. Therefore, starting at low speed is impossible when the transmission is set in the range for starting with high gear ratio, and the driver is required to operate the shift lever each time when selecting start at a low speed or starting at a high speed.

SUMMARY OF THE INVENTION

It is the object of the present invention to provide a transmission control system that allows not only starting with a high gear ratio without prior operation of the shift lever but also automatic setting of the transmission in the position for starting with a high gear ratio where it is allowable, or setting the transmission in the position for starting with a low gear ratio where starting with a high gear ratio is not allowable, depending on the load of the vehicle.

According to the present invention, the speed change control system, which includes the engine operation condition detection system, the vehicle speed detection system and the control system for calculating the target speed step based on the detected value of the load of the vehicle and for setting the speed step of the automatic transmission to the target speed step is designed to serve as the start control system, which is able to judge whether or not starting at high speed step is allowable, in reference with the load of the vehicle during the vehicle run, and set the speed step of the automatic transmission at a stop condition of the vehicle to the high speed step where starting at the high speed step is judged to be allowable, while the speed step of the automatic transmission at a stop condition of the vehicle is set to the low speed step where starting at the high speed step is judged to be not allowable.

The gear ratio is automatically changed over as the vehicle speed decreases when, for example, the opening of the throttle (one of the engine operation conditions) is constant. But whether or not starting can occur with the high gear ratio is judged in reference to the load of the vehicle during operation of the vehicle. Thus, the intended gear ratio at a stop condition is set to the high gear ratio (e.g. 2nd gear) if starting with the high gear ratio is judged to be possible. In addition, the intended gear ratio at a stop condition of the vehicle is set to the low gear ratio (e.g. 1st gear) if starting with the high gear ratio is judged to be not allowable. Namely, the speed change control system of the present invention is so designed such that it determines the starting gear ratio before the vehicle stops. Generally, the load of the vehicle is related not only to the vehicle weight but also to the load condition such as an uphill road, a downhill road or a level road. In order to determine the load of the vehicle during the vehicle stops, not only the load on the wheel axles but also the inclination of the vehicle must be measured. But in practicing such measurement, there are still problems to be solved concerning the construction, installation, accuracy and stability of the measuring instrument.

The load of a vehicle can be measured when it is running without using too many detectors and complex logic systems. According to the present invention, the starting gear ratio of a vehicle can be automatically set with a relatively simple construction and data processing logic.

The foregoing and other objects, features and advantages of the present invention will be understood more clearly and fully from the following detailed description of preferred embodiments with reference to the attached drawings.

BRIEF DESCRIPTION OF THE DRAWINGS

FIG. 3 is a block diagram showing the construction of the digital electronic control system to control power to the solenoid valves 320, 330 and 370 of the hydraulic control system of FIG. 2.

FIG. 4 shows the content of the program to describe the interrupting operation of the control system shown in FIG. 3.

FIGS. 5a, 5a1 and 5a2 are block diagrams showing further details of the principal part of the control system shown in FIG. 3.

FIG. 6b is a cross-sectional view of the throttle opening sensor 430 taken along line VIB—VIB of FIG. 6a.

FIG. 6e is a plan view showing the output cord of the throttle opening sensor 430.

FIG. 7b is a cross-sectional view of said solenoid valve taken along line VIIB—VIIB of FIG. 7a.

FIG. 8a is a graph showing the reference data for the shift position change stored in ROM 402.

FIG. 8b, 8c and 8d are the graphs showing the reference data for the shift position change to be stored in ROM 403 in reference to the data shown in FIG. 8a.

FIG. 12c is a graph showing the constraint time of the throttle opening between the start of the speed change and the lock-on.

FIGS. 13a, 13a1, 13a2, 13b, 13c, 13c1, 13c2, 13d and 13e are flow charts showing operations such as speed change judgment, speed change control, lock-on judgment, lock-on control and inertial running control which are to be performed by the digital electronic control system 400, based on the control program data stored in the fixed ROM 402.

DESCRIPTION OF PREFERRED EMBODIMENT

Figure 1:
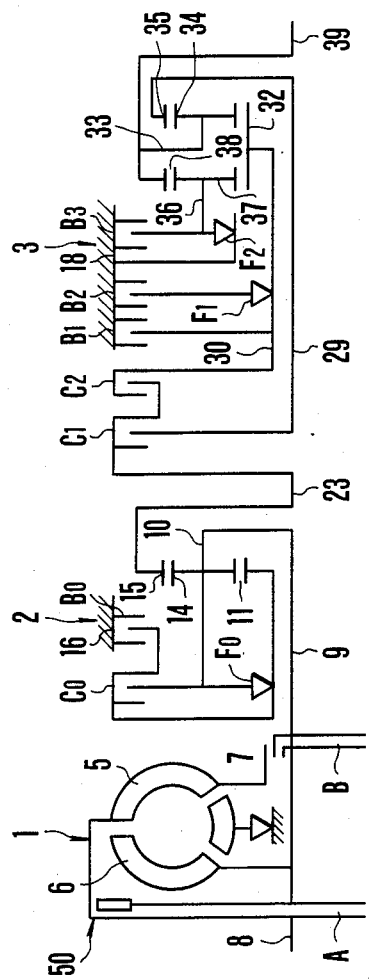
FIG. 1 is a block diagram showing the outline of the construction of the automatic transmission which is an embodiment of the present invention.

Referring to FIG. 1, there is shown a schematic diagram of an example of an automatic fluid transmission with the overdrive to be controlled. This automatic transmission includes a torque converter 1 with direct-coupled clutch, an overdrive system 2 and a three forward gear and one reverse gear transmission 3. In this automatic fluid transmission, the torque converter 1, including a pump 5, a turbine 6 and a stator 7 are known; the pump 5 is connected to the crank shaft 8 of the engine; the turbine 6 is connected to the turbine shaft 9; the turbine shaft 9 constitutes both the output shaft of the torque converter 1 and the input shaft of the overdrive system 2 simultaneously, and is also connected to the carrier 10 of the planetary gear system of the overdrive system; a direct-coupled clutch 50 is provided between the crank shaft 8 of the engine and the turbine shaft 9; the crank shaft 8 and the turbine shaft 9 are connected mechanically to each other when the direct-coupled clutch 50 is in operation; the planetary pinion 14 rotatably supported by the carrier 10 is engaged with the sun gear 11 and the ring gear 15; the overdrive multiple-disc clutch Co and the overdrive one-way clutch Fo are provided between the sun gear 11 and the carrier 10; the overdrive multi-disc brake Bo is provided between the sun gear 11 and the housing containing the overdrive system or the overdrive case 16 Np. The ring gear 15 of the overdrive system 2 is connected to the input shaft 23 of the gear transmission system 3; the front multi-disc clutch $C_1$ is provided between the input shaft 23 and the intermediate shaft 29; the multi-disc clutch $C_2$ for reverse is provided between the input shaft 23 and the sun gear shaft 30; there are the multi-disc brake $B_1$ and the multi-disc clutch $B_2$ between the sun gear shaft 30 and the transmission case 18 though $B_2$ is installed through the one-way clutch $F_1$; the sun gear 32 installed on the sun gear shaft 30 constitutes two rows of planetary gear systems together with the carrier 33, the planetary pinion 34 supported by said carrier, the ring gear 35 engaged with said pinion, another carrier 36, the planetary pinion 37 supported by said carrier, and the ring gear 38 engaged with said pinion; the ring gear 35 in one of the two planetary gear systems is connected to the intermediate shaft 29; the carrier 33 in said planetary gear system is connected to the ring gear 38 of another planetary gear system, and the carrier and ring gear are connected to the output shaft 39; and the multi-disc brake $B_3$ and one-way clutch $F_2$ are located between the carrier 36 of the second planetary gear system and the transmission case 28.

Such an automatic fluid transmission with an overdrive gear is so designed that the engagement and the disengagement of the clutches and the brakes can be made by a hydraulic control system, which will be described in detail hereinbelow, depending on the engine output and the vehicle speed to accomplish the shift among the four forward gear ratios including overdrive and reverse gear ratio.

Table 1 shows the positions of the transmission gears and the actions of the clutches and the brakes. In this table, 0 indicates that the clutch and the brake are engaged, while X indicates that they are disengaged.

TABLE 1

| Shift position | | | Friction engagement system | | | | | | | | | |
|---|---|---|---|---|---|---|---|---|---|---|---|---|
| | | | Clutch | | | Brake | | | | One-way clutch | | |
| | | | $C_0$ | $C_1$ | $C_2$ | $B_0$ | $B_1$ | $B_3$ | $B_2$ | $F_0$ | $F_2$ | $F_1$ |
| Parking (P) | | | o | x | x | x | x | o | x | | | |
| Reverse (R) | | | o | x | o | x | x | o | x | Lock | Lock | |
| Neutral (N) | | | o | x | x | x | x | x | x | | | |
| Forward | D-range | 1st | o | o | x | x | x | x | x | Lock | Lock | OVR |
| | | 2nd | o | o | x | x | o | x | o | Lock | OVR | Lock |
| | | 3rd | o | o | o | x | x | x | o | Lock | OVR | OVR |
| | | O/D (4th) | x | o | o | o | x | x | o | OVR | OVR | OVR |
| | 3-ranges | 1st | o | o | x | x | x | x | x | Lock | Lock | OVR |
| | | 2nd | o | o | x | x | o | x | o | Lock | OVR | OVR |
| | | 3rd | o | o | o | x | x | x | o | Lock | OVR | Lock |
| | 2-ranges | 1st | o | o | x | x | x | x | x | Lock | Lock | OVR |
| | | 2nd | o | o | x | x | o | x | o | Lock | OVR | Lock |
| | L-range | | o | o | x | x | x | o | x | Lock | OVR | Lock |

(Note) OVR = Overrun

Figure 2:
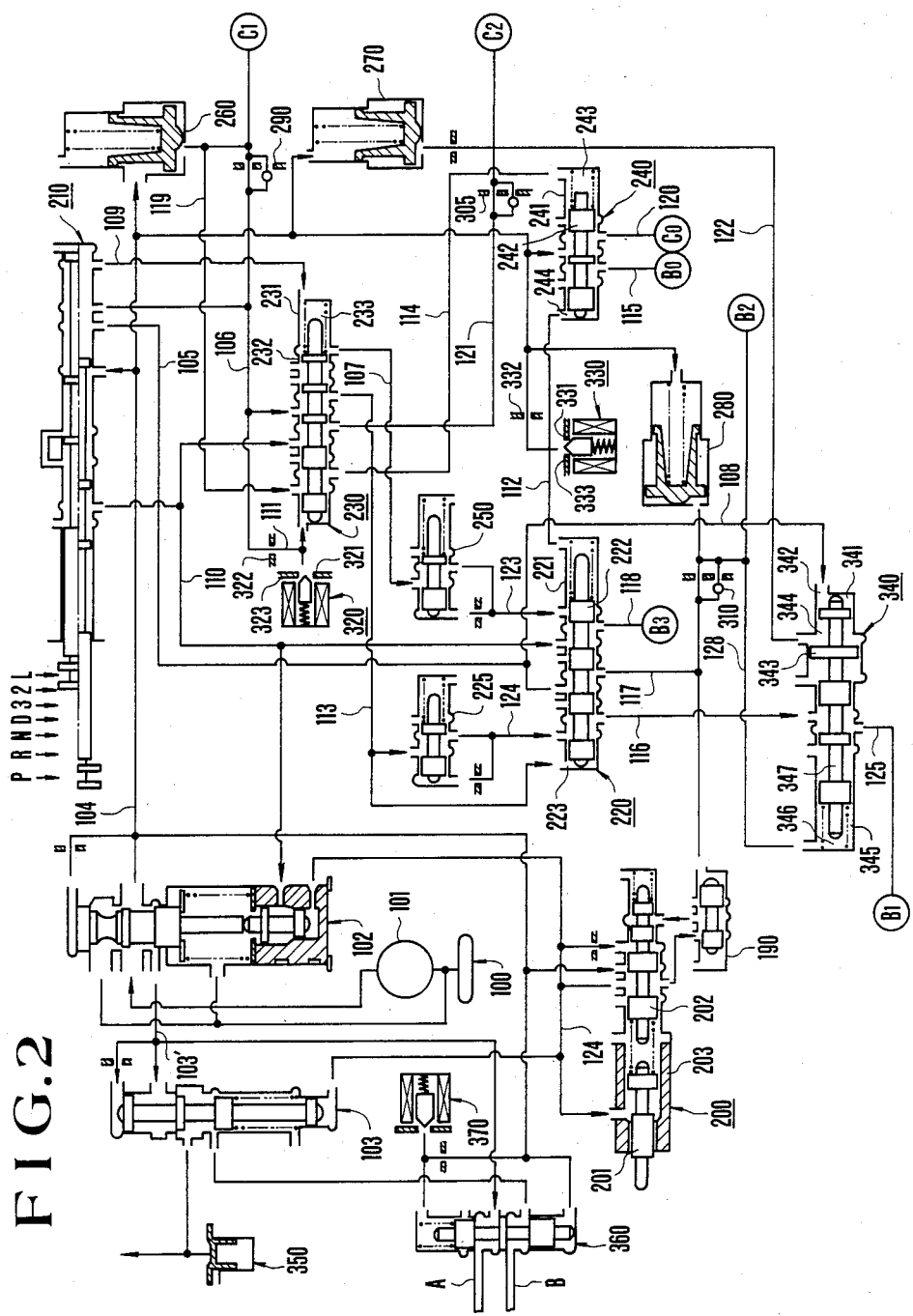
FIG. 2 is a block diagram showing the hydraulic control system to control the operation of the automatic transmission of FIG. 1.

FIG. 2 shows the hydraulic circuit designed for selectively operating the clutches $C_o$, $C_1$ and $C_2$, the brakes $B_o$, $B_1$, $B_2$ and $B_3$ and the direct-coupled clutch 50 of the torque converter of said automatic transmission to accomplish the automatic speed change operation. The hydraulic circuit shown in FIG. 2 consists of an oil pan 100, oil pump 101, pressure control valve 102, auxiliary pressure control valve 103, cutback valve 190, throttle valve 200, manual valve 210, 1-2 shift valve 220, 2-3 shift valve 230, 3-4 shift valve 240, low coast modulator valve 250, intermediate coast modulator valve 225, accumulator valves 260, 270 and 280, flow control valves (with check valves) 290, 305 and 310, solenoid valves 320 and 330, dual sequence valve 340, cooler bypass valve 350, lockup clutch control valve 360, lockup control solenoid valve 370, and oil passes to connect these valves, clutches and the hydraulic pressure of the brakes servo-mechanically.

The hydraulic oil pumped up from the oil pan 100 by the hydraulic pump 101 is set to the specified pressure (line pressure) by the pressure control valve 102, and the oil is supplied to the oil passes 104 and 103'. The pressure of the oil supplied to the auxiliary pressure control valve 103 through the oil pass 103' is adjusted to the specified torque converter pressure, lubricating oil pressure and cooler pressure according to the throttle pressure of the throttle valve 200. The manual valve 210 communicating with the oil pass 104 also communicates with the shift lever provided at the operator's seat, and is shifted to the positions of P, R, N, D, 3, 2 and L according to the range of the shift lever to be operated manually. Table 2 shows the communications between the oil pass 104 and the oil passes 105, 106, 109 and 110. In this table, 0 indicates the presence of fluid communication.

TABLE 2

| | P | R | N | D | 3 | 2 | L |
|---|---|---|---|---|---|---|---|
| Oil pass 105 | | | 0 | 0 | 0 | 0 | 0 |
| Oil pass 106 | | | | 0 | 0 | 0 | 0 |
| Oil pass 109 | | | | | | | 0 |
| Oil pass 110 | | 0 | | | | | |

The first solenoid valve 321 tlat controls the 2-3 shift valve 320 closes its valve opening 321 when it is not energized with electricity to produce a hydraulic pressure in the oil pass 111 communicating with the oil pass 106, through the oriffice 322, and the valve opening 321 opens when said valve is energized with electricity to exhaust the hydraulic pressure of the oil pass 111. The second solenoid valve 330 that control the 1-2 shift valve 220 and the 3-4 shift valve 240 closes its valve opening 330 when it is not energized with electricity in order to exhaust the hydraulic oil of the oil pass 112 commmunicating with the oil pass 104, through the orifice 332.

Table 3 shows the relationship between the solenoid valves 320 and 330 at the electrically-energized time and at the non-energized time, which are controlled by the electronic circuit whose details will be described later, and the condition of the automatic transmission gearing.

TABLE 3

| Manual valve shift position | N | D | | | | R |
|---|---|---|---|---|---|---|
| Speed charge gear ratio | | 1st speed | 2nd | 3rd | 4th | |
| 1st solenoid valve 320 | De-energized | Ener-gized | Ener-gized | De-energized | De-energized | Ener-gized |
| 2nd solenoid valve 330 | De-energized | Energ-gized | De-energized | Ener-gized | De-energized | De-energized |

The 1-2 shift valve 220 has a spool 222 having a spring installed behind it. The solenoid valve 330 is electrically energized, and the pressure of the oil pass 112 is released at the first speed, and the spool 222 is set to the right side in the drawing, by the hydraulic pressure which is supplied to the oil chamber 223 through the oil pass 113, while the spool 222 is set to the left side in the drawing, at the 2nd spool as the hydraulic pressure is produced in the oil pass 112 when the supply of the electricity to the solenoid valve 330 is discontinued.

At the 3rd and 4th speeds, the spool of the 2-3 shift valve, which will be described later, is set to the right side in the drawing to cause the pressure of the oil chamber at the left end to be released through the oil pass 113, and, as a result, the spool 222 is fixed to the left side in the drawing.

The 2-3 shift valve 230 has a spool 232 having a spring installed on one side, and the spool 232 is set to the left side in the drawing, due to the spring action, since the solenoid valve 320 is electrically energized at the 1st or the 2nd speed, and no hydraulic pressure is present in the oil pass 111, whereas at the 3rd or 4th speed, the hydraulic pressure is produced in the oil pass 111 when the supply of the electricity to the solenoid valve 320 is discontinued, and the solenoid valve is set to the right side in the drawing.

The 3-4 shift valve 240 has a spool 242 having a spring installed on one side, and the spool 242 is fixed to the left side in the drawing, at the 1st or the 2nd speed, as the line pressure being fed to the oil chamber 243 through the oil pass 114. As for the 3rd and the 4th speed, when the pressure of the oil pass 114 is released at the 3rd speed, the solenoid valve 330 is electrically energized, and the spool 242 is set to the left side in the drawing, by the action of the spring 241, since the pressure of the oil pass 112 has been released, while at the 4th speed, the solenoid valve 330 is not electrically energized, and hydraulic pressure is produced in the oil pass 112 to cause the spool 242 to be set the right side in the drawing.

The throttle valve 200 produces a throttle pressure in the oil pass 124 when the accelerator pedal is pressed, since the indicator valve 201, which strokes according to the degree of depressing the accelerator pedal, compresses the spring 203 provided between said valve 201 and valve sporl 202.

When the manual valve 210 is at N position, only the oil pass 105 communicates with the oil pass 104, so that no hydraulic pressure is produced in the oil passes 111 and 112 even when both the solenoid valves 320 and 330 are not electrically energized, and the spools 232 and 242, which are the spools of the 2-3 shift valve 230 and the 3-4 shift valve 240, respectively, remain in the left side position in the drawing. In this condition, the hydraulic pressure acts on $C_0$ to cause $C_0$ to be engaged, since the oil pass 104 communicates with the oil pass 120 through the 3-4 shift valve 240, and the pressure of the oil pass 115 communicating with the drain port is released to cause the brake $B_0$ to be released. As a result, the overdrive system is in a direct-coupled condition.

When the manual valve 210 is shifted manually to the R position, a hydraulic pressure is produced in the oil pass 110; the spool 232 is set to the left side in the drawing; and the hydraulic pressure is supplied to the oil chamber on the right end of the 3-4 shift valve 240 through the 2-3 shift valve 230 and the oil pass 114, whereby the engagement of the overdrive gear in the overdrive system 2 is maintained for about 1 second at the time of N-R shift, and the engagement of the reverse gear is made in the planetary gear system. One second after N-R shift, the hydraulic pressure in the oil chamber increases; the spool 242 is shifted to the left in the drawing; the oil pass 104 communicates with the oil pass 120, whereby the hydraulic pressure is supplied to the clutch $C_0$, and the pressure of the oil pass 115 is released; as a result, the brake $B_0$ is released; the clutch $C_0$ is engaged; and the planetary gear unit is in the normal reverse condition.

Also, when N-D shift is made marually, the spool 222 of the 1-2 shift valve 220 is at the right side in the drawing at the 1st speed; the pressure of the oil passes 116 and 117 communicating with the brakes $B_1$ and $B_2$ is released; and the brakes $B_1$, $B_2$ and $B_3$ are left open, since the hydraulic pressure is not supplied to the oil pass 118 communicating with the brake $B_3$ either.

At the 1st speed, the dual sequence valve 340 presses the spring 345 by the line pressure supplied to the oil chamber 341 at the right end through the oil pass 108 branched from the oil pass 105, and the spool 347 is set to the left side in the drawing.

When the predetermined vehicle speed is reached, the supply of electricity to the solenoid valve 330 is discontinued by the output of the computer; the spool 222 of the 1-2 shift valve 220 is shifted to the left side; the line pressure supplied through the oil passageways 105 and 117 cause the brake $B_2$ to engage gradually through the flow rate control valve 310 and the accumulator 280 and is supplied to the oil chamber 346 on the left end of the dual sequence valve 340 through the oil pass 128, whereby the spool 347 starts to be shifted to the right in the drnwing when the sum of the elasticity of the spring 345 nnd the gradually increasing pressure of the oil chamber 346 has exceeded the line pressure acting on the land 342. When the spool 347 has moved to the right after the set time, the brake $B_1$ is engaged by the hydraulic pressure supplied through the oil pass 106—2-3 shift valve 230—oil pass 113—intermediate coast modulator valve 255—oil pass 12—1-2 shift valve 220—oil pass 116—dual sequence valve 340—oil pass 125 in the given order, since the spool 232 of the 2-3 shift valve 230 is on the left side when the solenoid valve 320 is electrically energized, whereby the 2nd speed at which the engine braking is effective can be obtained. In this case, the dual sequence valve 340 serves to determine the timing of the engagement of the brake $B_1$ after the transmission unit has entered the 2nd speed condition following the engagement of the brake $B_2$.

Shifting to the 3rd speed is controlled by the output of the computer when the vehicle speed and the opening of the throttle have reached the specified values. As a result, the supply of electricity to the solenoid valve 320 is discontinued; the spool 232 of the 2-3 shift valve 230 is moved to the right side in the drawing; the hydraulic pressure is supplied through the oil passes 106 and 121 and the flow rate control valve 305 to make the clutch $C_2$ to engage, and simultaneously, the spool 222 of the 1-2 shift valve 220 is fixed to the left side in the drawing, because of the pressure exhausted from the oil chamber 223 and the action of the spring 221.

At the 3rd speed, the pressure of the dual sequence valve 340 is supplied to the oil chamber 344 consisting of the land 342 and the land 343, which is larger in diameter by the specified length than the former, through the oil pass 121 and the oil pass 122 branched from the former, and the spool is shifted to the left side in the drawing, whereby the oil pass 125 will communicate with the oil drain port to release the pressure, and the brake $B_1$ is released.

As in the case of the 3rd speed, shifting to the 4th speed is accomplished by engagement of the brake $B_0$, which requires stopping the supply of electricity to the solenoid valve 330 by the output of the computer, shift of the spool 242 of the 3-4 shift valve to the right side in the drawing, exhausting of the pressure of the oil pass 120, supply of pressure to the oil pass 115, and release of the clutch $C_0$ to the engagement of the brake $B_0$.

The 4-3 down shift from the 4th speed to the 3rd speed is done in the reverse order to the above-mentioned 3-4 shift. In this shift, the solenoid valve 330 is electrically energized; the spool 242 of the 3-4 shift valve 240 is shifted to the right side in the drawing; the pressure of the oil pass 115 is released, and simultaneously the hydraulic pressure is supplied to the oil pass 120; the brake $B_0$ is released, and simultaneously the clutch $C_0$ is engaged to complete the the shift.

The 3-2 down shift from the 3rd speed to the 2nd speed is accomplished by electrically energizing the solenoid valve 320 to cause the spool 232 of the 2-3 shift valve 230 to be shifted to the left side as illustrated in the drawing, the pressure of the oil pass 121 to be released, the clutch $C_2$ to be released, whereby the pressure of the oil pass 122 branched from the oil pass 121 and the oil chamber 344 communicating with the former oil pass is released after the engagement of the one-way clutch $F_1$ is completed; the spool 347 of the dual sequence valve 340 is shifted to the right side in the drawing despite the hydraulic pressure supplied to the oil chamber 346 from the oil pass 128 and the hydraulic pressure applied to the land 342 by the elasticity of the spring 345; and the oil pass 125 communicates with the oil pass 116 to cause the brake $B_1$ to be engaged. In this case, the dual sequence valve 340 serves to determine the timing between the timing of engagement of the one-way clutch $F_1$ and the timing of the engagement cf the brake $B_1$.

When the manual valve 210 is in the position 3, shifting to the 1st, 2nd and 3rd speeds occurs in a manner similar to that in the case when the manual valve is in D position, but shifting to the 4th speed does not occur, since the line pressure is supplied to the oil chamber 243 on the right end of the 3-4 shift valve through the oil passes 106 and 114 to fix the spool 242 to the left side in the drawing. Also, when the D-3 shift occurs manually during running with the manual valve 210 set in D position, downshifting to the 3rd speed can be made immediately.

When the manual valve is in position 2, the 1st speed can be obtained in the same condition as that when the manual valve is in the D position, and at the 2nd speed, the line pressure is supplied through the oil passes 106 and 116 to engage the brake $B_1$ so that engine braking occurs. Also, when the shift to the position 2 is made manually during running is operating at the 3rd speed, the solenoid valve 320 is energized electrically by the output of the cexputer when the speed is reduced to the predetermined speed, to accomplish 3-2 downshift.

When the manual valve 210 is shifted to position 1, the hydraulic pressure is supplied to the oil pass 109; the line pressure is supplied tc the oil chamber 233 on the right end of the 2-3 shift valve 230; the spool 232 is fixed to the left side in the drawing; and 4-2 downshift or 3-2 downshift is acromplished immediately. The 2-1 downshift can te made when the solenoid valve 330 is energized electrically by the output of the computer after the speed is reduced to the predetermined speed, and simultaneously, the hydraulic pressure of the oil pass 109 causes the brake $B_3$ to engage through the oil pass 107, the low coast modulator 250 and the oil passes 123 and 118.

The lockup clutch control valve 360 has a spool provided with a spring; when the lockup control solenoid valve 370 is not in action, the spool is shifted downward in the drawing by the force of the spring, since the pressure of the upper end chamber of the spool is equal to that of the lower end chamber of the spool; the hydraulic pressure of the oil pass 103' is supplied to the oil pass A of the direct-coupled clutch 50; the drain oil pressure is supplied to the oil pass B through the auxiliary pressure control valve 103 and the cooler bypass valve 350, whereby the direct-coupled clutch 50 is released (or kept unlocked). When the lockup clutch control solenoid valve 370 is in action, the spool of the lockup control valve 360 is driven upward despite the spring pressure; the drain oil pressure is applied to the oil pass A of the direct-coupled clutch 50; the hydraulic pressure of the oil pass 103' is applied to the oil pass B, whereby the direct-coupled clutch 50 is locked up.

In the hydraulic circuit shown in FIG. 2 and described above, it is possible to control the timings of the brake $B_1$, brake $B_2$ and one-way clutch F at the time of 1-2 shift and 3-2 downshift only by one dual sequence valve 340.

FIG. 3 shows the block diagram of the digital electronic control system 400 for the automatic speed change control through control of the opening and closing of the solenoid valves 330, 320 and 370 and for control of the lockup function. The iigital electronic control system is called a central processing unit or a microprocessor, which consists mainly of a large-scale integrated circuit logic circuit 401 (hereinafter referred to as a CPU) having a highly efficient operation and processing function, the logic action control program, the read-only memory 402 (hereinafter referred to as ROM) for storage of various data, the random access memory 403 (hereinafter referred to as RAM) for storing and reading data and temporary input-output data of ROM 402, input-output port 404, clock pulse generator 405, frequency divider 406 and the system controller 407 for specifying the read-write memory.

In CPU 401, ROM 402 and RAM 403, there are connected the address line, data line and clock pulse line in common; the basic clock is generated by the generator 405 and is applied to the tasic clock input terminal of each of the components 401 through 403 and 406. Frequency divider 406 divides the frequency of the basic clock and applies the divided frequency to the interruption terminal of CPU 401. In this embodiment of the present invention, interruption occurs at the frequency of the output pulse of said frequency divider, since the change due to travel on a sloping road or the change from travel on a sloping road to travel on level road is detected from the traveling state of the vehicle and according to this the constraining conditions of travel range changeover or the control conditions of the travel range changeover are changed. An outline of the interrupting operation in the CPU 401 is illustrated in FIG. 4. In this process, the program of ROM 402, which will be described later, is advanced address by address. The interruption function is a function that shifts the address of the program counter to a specified address (to the 3CH address in FIG. 4), and the interruption command to execute this interruption function is held by CPU 401 so that the interruption command is not executed at a program address where an error is caused if executed. The interruption instruction is held up to the address ABH of the program where interruption is enabled, interruption is recognized, as such; the code of the program counter changes to the specified interruption address (3CH address in FIG. 4), and when the execution of the program of that address is completed, it returns to the address ACH next to the interruption command recognition address.

In addition to the programs for the detection of interruption and the execution of the interruption, ROM 402 stores program data and data concerning the constants to be referred in executing these programs such as the program for judging the running speed range at the time of the running on a level road and its reference data, the running speed range change program, the program for detection of the vehicle load at the time of the running on a slope and its reference data, the program for constraining the change of the running speed range and its reference data, the constraint release program and its reference data, the program for constraining nonlockup condition, the program for temporary release of lockup, and the throttle opening detection program, which will be described later, respectively. These programs are executed depending on the position of the shift lever (L, 2, 3, D, R), vehicle speed (number of revolution of the output shaft of automatic transmission) and the opening of the throttle, and the opening and closing actions of the solenoid valves 320, 330 and 370 are controlled by executing these programs.

For the above-mentioned purpose, the input-output port 404 is connected to the shift le,er position sensor 430 and the solenoid drivers 440, 441 and 442. In FIG. 3 and in the following description, the input-output port 404 and the frequency divider 406 are described as the units independent of ROM 402 and RAM 403, but there are ROMS and RAMS in which the input-output port is contained in one chip, and RAMS in which the frequency divider and the input-output port are contained in one chip. Thus, it should be noted that the indications on the drawing and the following description concerning the configuration are made in accordance with one of the methods of expression such that there are cases when the components and the elements are not necessarily required to be combined as indicated in the drawing.

FIG. 5a shows an example of the basic part of the digital electronic controller 400 (see FIG. 3). In this example, ROM 402 consists of two chips, 402-1 and 402-2. When a constant voltage (+5 V) is applied to each part and the switch 407 is closed, each of the actions, which will be described later, is carried out repetitively according to the programs stored in ROM 402-1 and ROM 402-2. A constant voltage of +5 V is supplied by the constant-voltage circ:it shown in FIG. 5b.

The vehicle speed generator 420 consists of an induction coil 421 connected to the output shaft of the transmission for detecting the revolution of the permanent magnet and the pulse-generating circuit 422, and the pulses that are in proportion to the number of the revolution of the output shaft are outputted from the pulse-generating circuit 422. This output pulse is supplied to the count pulse input terminal CLK of the counter COU. The count code of the counter COU is supplied to the latch LUT. This latch action and the count action are continued while the pulse of a fixed period is applied to the frequency divider FDE from the output terminal TIMER OUT of RAM 403. Thus, the output code of the latch LUT represents vehicle speed.

Figure 5D:
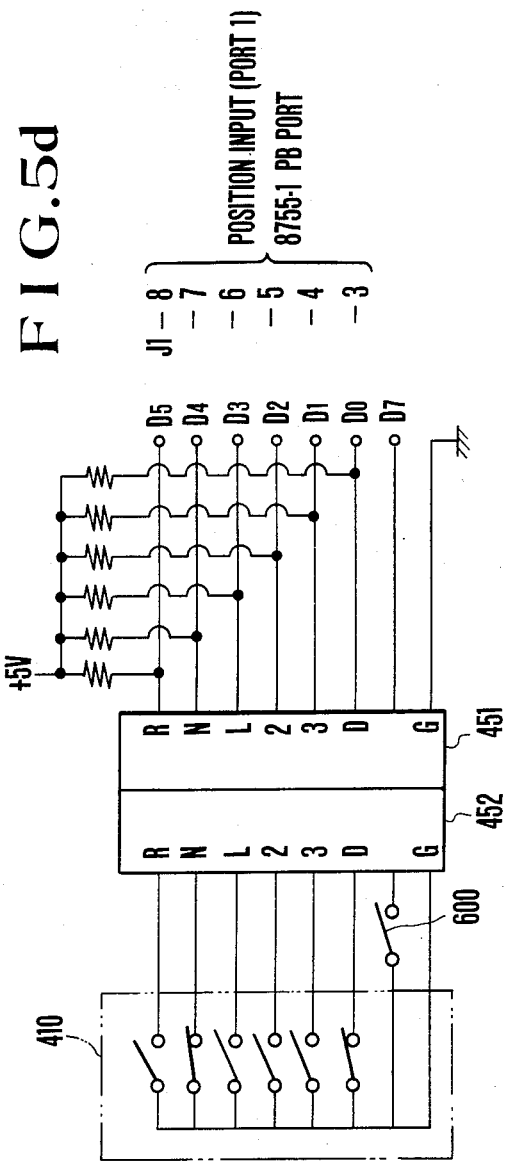
FIG. 5d is a circuit diagram showing the circuit in the shift lever position sensor 410, the inertial running instruction switch and the connectors to connect these two units to the input-output port 404.
Figure 5B:
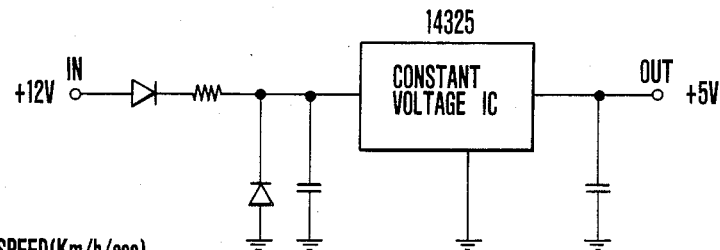
FIG. 5b is a circuit diagram showing the power circuit.
Figure 5C:
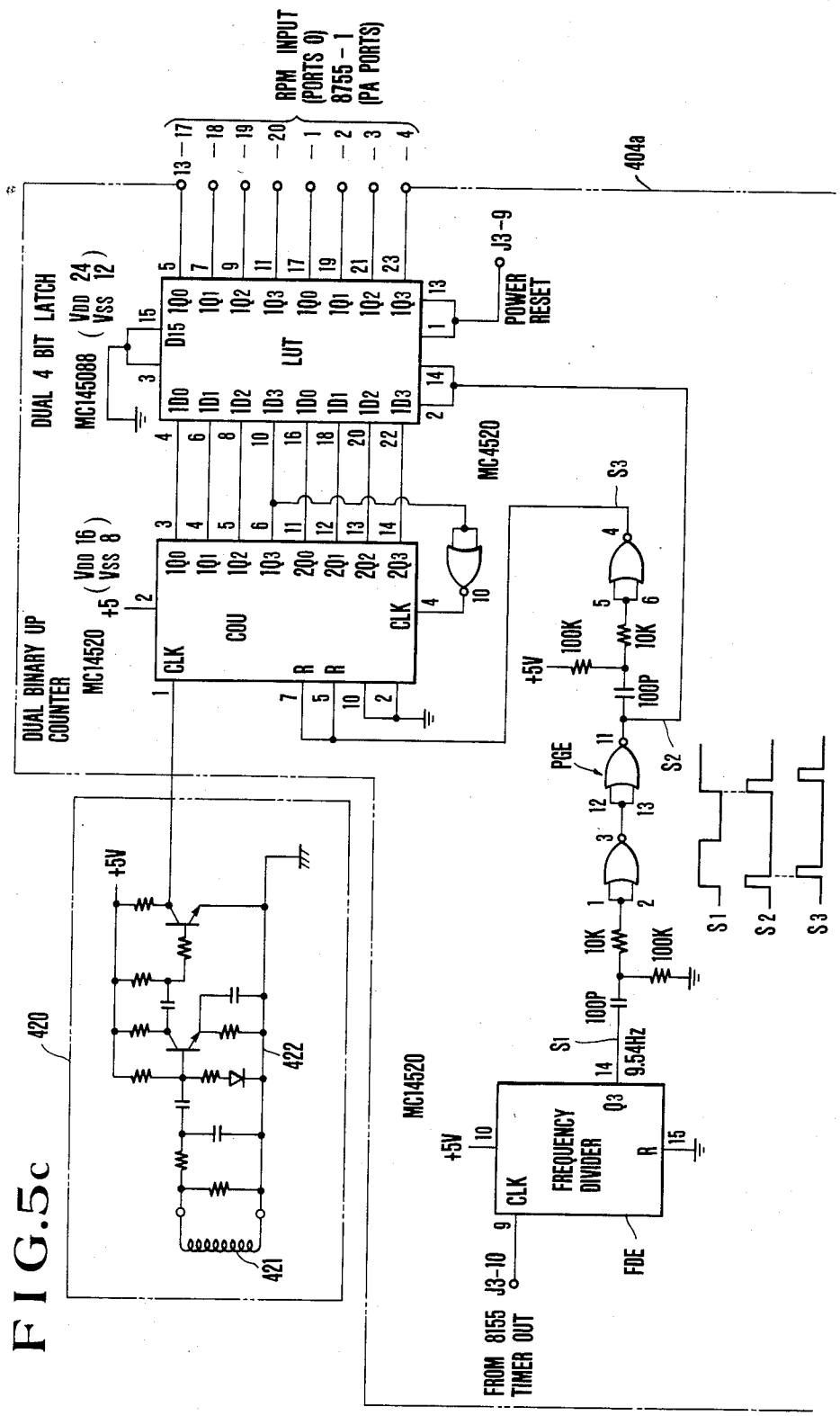
FIG. 5c is a circuit diagram showing the vehicle speed detection circuit.
Figure 5E:
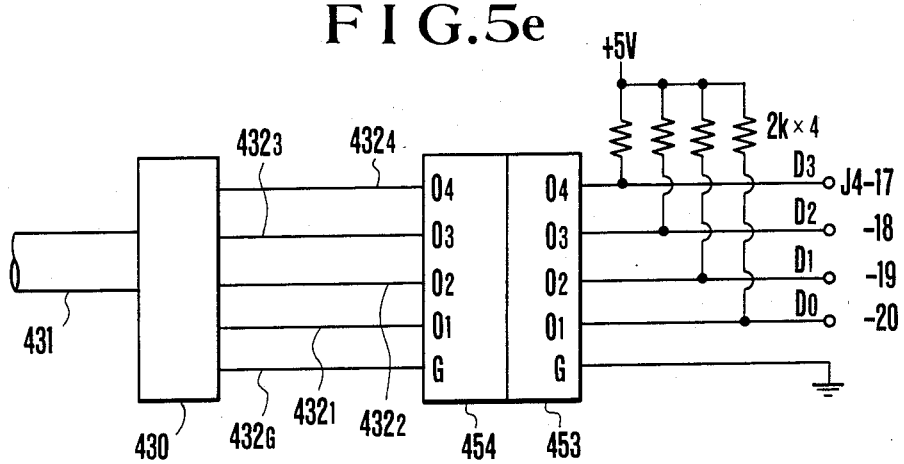
FIG. 5e is a circuit diagram showing the connection circuit of the throttle opening sensor.
Figure 5F:
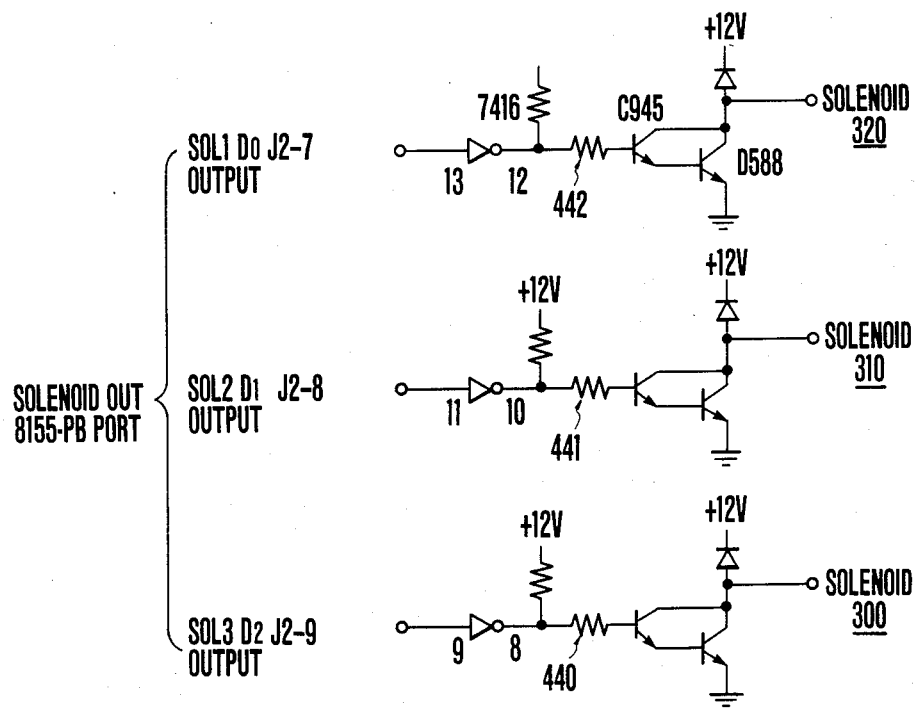
FIG. 5f is a circuit diagram showing the circuit in the solenoid driver.

As shown in FIG. 5d, the switch of the shift lever position sensor 410 and the 2nd start instruction switch 600 are connected to the input ports PAO through PB7 of ROM 402-1 through the connectors 451 and 452. Also, as shown in FIG. 5e, the throttle opening sensor 430 is connected to the ports PAO through PA7 of RAM 403 through the connectors 453 and 454, and, similarly, the solenoid drivers 440 through 442 are connected to the ports PBO through PB7 as shown in FIG. 5f.

Figure 6A:
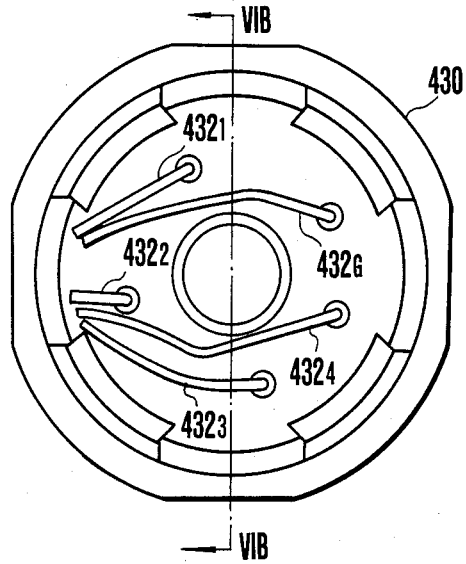
FIG. 6a is a plan view of the throttle opening sensor 430.
Figure 6B:
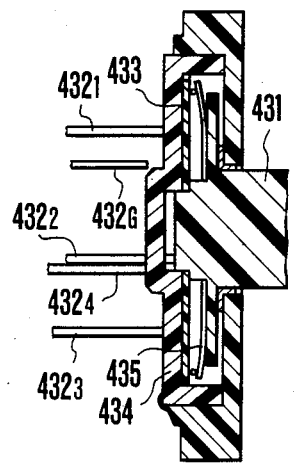
Figure 6C:
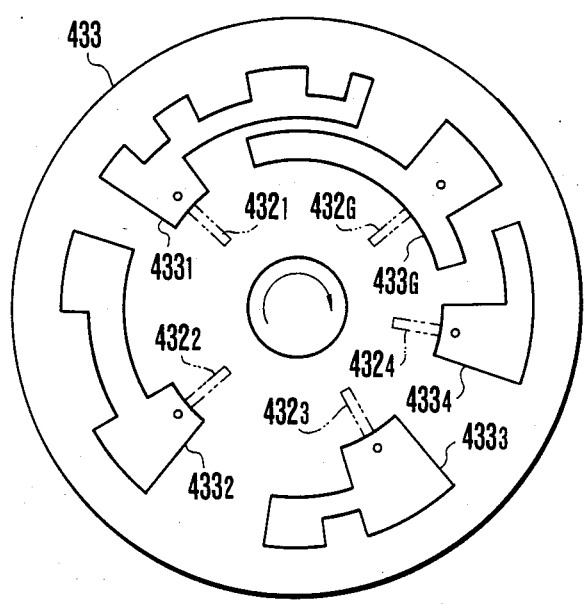
FIG. 6c is an enlarged plan view of the printed circuit board 433 of said sensor.

The throttle opening sensor 430 is a potentiometer type digital code generator consisting of a shaft 431 which is connected to the shaft of the throttle valve, and rotates with the shaft, the rotary contacts fixed to the shaft, and the fixed contacts whose number is equal to those of the contacts, and the plan view of the outgoing side of the terminal lead wires is shown in FIG. 6a, while the sectional view of VIB—VIB line is shown in FIG. 6b. This digital code generator 430 is designed to indicate the opening of the throttle in 16 steps ranging from 0 to 15 by a 4-bit code, and consisting of the 4 pieces of output lead wires $4321_1$ through $432_4$, which output bit signal of one digit to four digits respectively, and one lead wire $432_G$ for grounding, which are connected respectively to the divided printed electrodes of the circular printed circuit board 433. FIG. 6c shows an enlarged plan view of the printed circuit board 433.

Figure 6D:
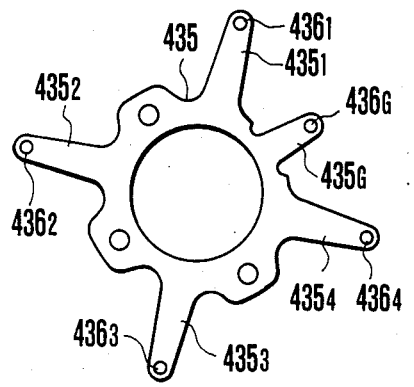
FIG. 6d is a plan view of the slider 435 of said sensor.

The divided electrodes $433_1$ through $433_4$ for obtaining the outputs ranging from 1-digit bit to 4-digit bit, and the divided electrode $433_G$ to be maintained at the ground potential are formed on the printed circuit board 433, and when the printed circuit board 433 is divided into 4 parts at 90°, respectively, the 4 units of divided electrodes $433_1$ through $433_4$ are arranged on these 4 divided parts of the board respectively. This printed-circuit board 433 is fixed to the housing base 434. The slider 434 made of the elastic material is fixed to the shaft 431. FIG. 6d shows the plan view of this slider. Four arms $435_1$ through $435_4$ are formed on this slider at an interval of 90° and another arm $435_G$ is formed between the arm $435_1$ and the arm $435_4$.

The contact members $436_1$ through $436_4$ and $436_G$ are fixed to the ends of the arms $435_1$ through $435_4$ respectively; the printed circuit board 433 is fixed to the housing as shown in FIG. 6b; the contact members $436_1$ through $436_4$ are located at the outermost uneven parts of the divided electrodes $433_1$ through $433_4$, respectively, so that they contact each other with the shaft 431 fixed; and the contact member $436_G$ contact the innermost arc-shaped part of the divided electrode $433_G$. In other words, within the rotary range (90°) of the shaft 431, each of the contact members $436_1$ through $436_4$ contacts or does not contact each of the divided electrodes $433_1$ through $433_4$ depending on the pattern of the outermost parts of these divided electrodes. Taking, for example, the case of the divided electrode $433_1$, when it is in contact with the contact member $436_1$, it is at the ground potential, and the connecting lead wire $432_1$ connected to it through the through-hole plating and the back electrode is also at the ground potential; however, when the contact member $436_1$ is not in contact (with the divided electrode $433_1$), the connecting lead wire $432_1$ and the divided electrode $433_1$ are both at a +5 V level, since the voltage of +5 V is applied to the lead wire $432_1$ through the connectors 453 and 454 as shown in FIG. 6e.

As described above, the electrode patterns, which has the ground potential or +5 V depending on the turning angle of the shaft 431 or the slider 435, are formed on the divided electrodes $433_1$ through $433_4$ respectively. In the embodiment of the present invention, the rotary range (90°) of the shaft 431 is divided into 16 portions so that the opening of the throttle can be indicated in 16 steps; the patterns of the divided electrodes $433_1$ through $433_4$ are designed so that they have either the ground level (0) or +5 V level (1) by the gray pattern, as shown in FIG. 6e, depending on the turning angle of the shaft 431; the throttle angles of 0° to 15° are represented by the outputs $0_1$ to $0_4$ of the connecting lead wires $432_1$ through $432_4$ to be expressed by 4 bits. The gray pattern is used to make the opening of the throttle to be represented by $0_1$ through $0_4$ very close to the actual opening even when the contact members $436_1$ to $436_4$ are detached instantaneously from the divided electrodes $433_2$ through $433_4$. For example, when the throttle opening changes from 3 (0010) to 4 (0110), in the transitional state of the contact member $436_3$ coming to contact the divided electrode $433_3$, the opening code 0010, as it is, represents the opening degree 3, and it does not indicate an opening degree which is deviated greatly from the opening degree of about 4. In the case of the ordinary bianary code, for example, the opening degree 3 is represented by 0011, and the opening degree 4 by 0100, but, during the period of change from 0011 to 0100, the codes representing those deviated from the opening degrees of 3 and 4 such as 0111 (Opening degree 7), 0101 (Opening degree 5), 0000 (Opening degree 0) or 0001 (Opening degree 1) may be generated, but in the case of the afore-mentioned throttle opening sensor 430 such deviated codes are not produced.

Figure 7A:
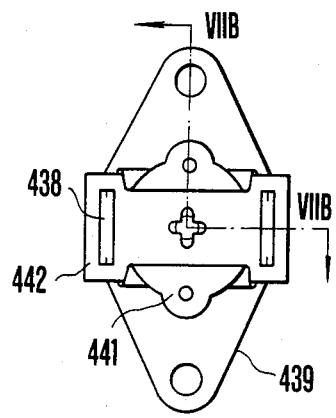
FIG. 7a is an elevation view showing one of the solenoid valves 320, 330 and 370 shown in FIG. 2.
Figure 7B:
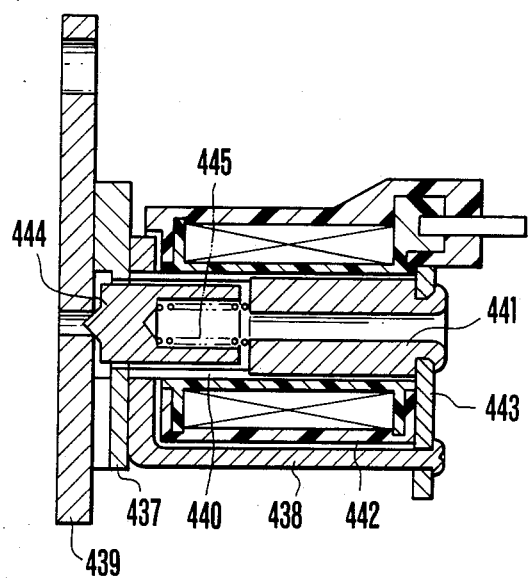

FIG. 7a shows the back view of one of the solenoid valves 320, 330 and 370 having the same construction, and FIG. 7b VIIB—VIIB the sectional view of the same. This solenoid valve consists of a valve plate 437 and a carrier 438 which are joined by spot-welding, an orifice plate 439 welded to the valve plate 437 by the projection welding, a sleeve 440 inserted into the hole of the carrier 438 with the end of the former in contact with the valve plate 437, a core 441 whose end is pressed against the rear end of the sleeve 440 with a coil case 442 installed on this assembly, the back plate fixed to the carrier 438 and the rear end of the core 441 by caulking, a plunger 444 and a compression spring 445. In the case of this solenoid valve, the distance between the orifice plate 439 and the plunger 444, or the operating space of the plunger, is determined by the sum of the thickness of the valve plate 437 and the length of the sleeve 440; its accuracy being dependent only on the accuracy of the thickness of the valve plate 437 and that of the length of the sleeve 440; and the error in the length of the plunger 444 and that in the thickness of the back plate 443 do not affect the determination of the operating space of the plunger 444.

Figure 8C:
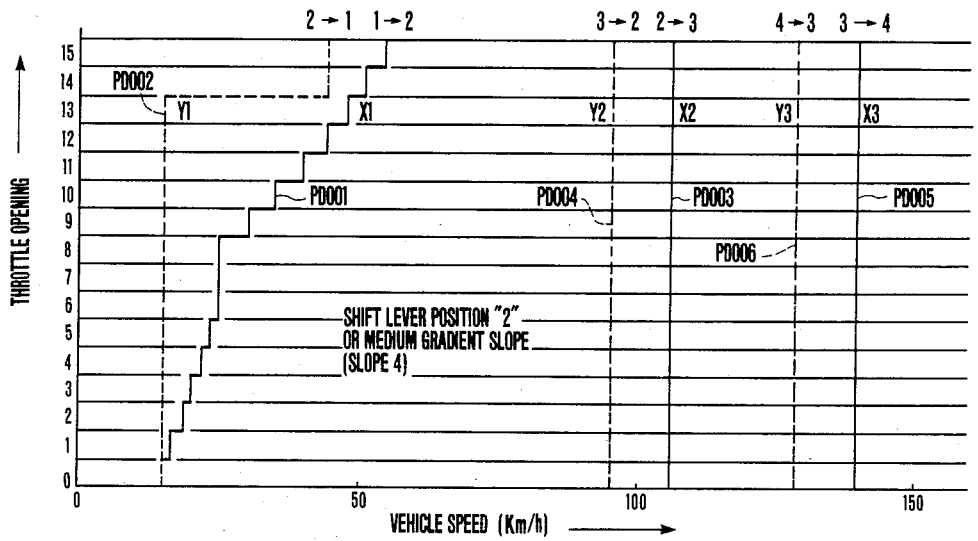
Figure 8D:
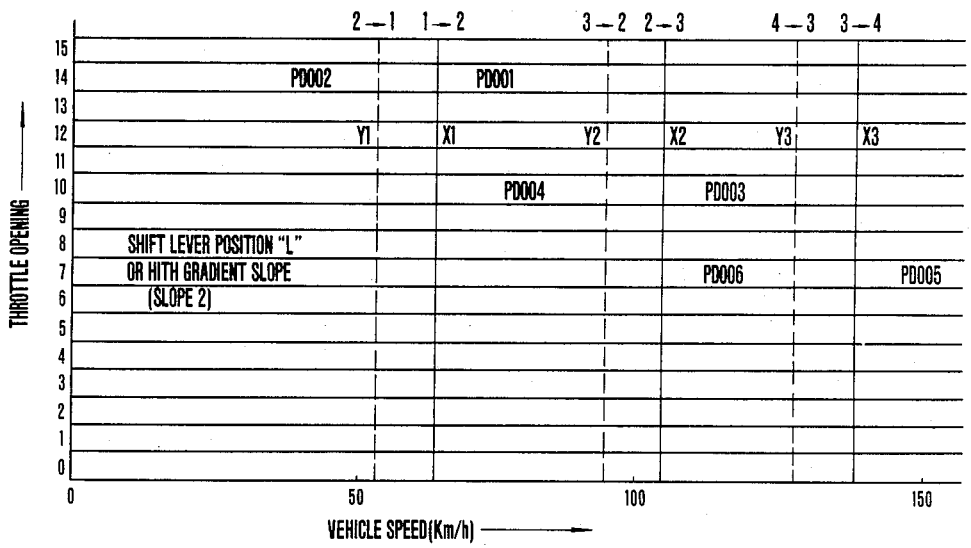
Figure 10A:
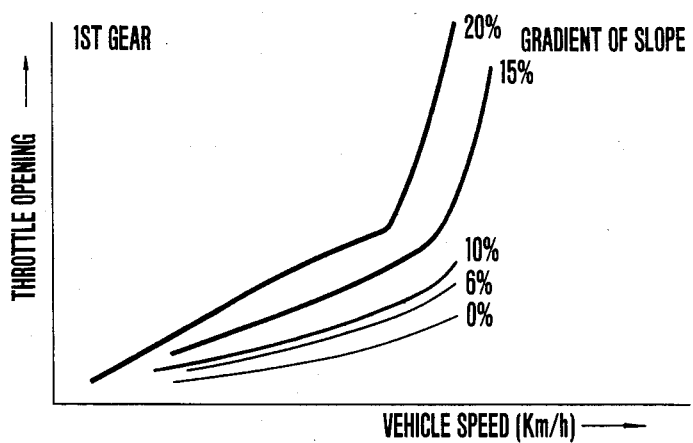
FIGS. 10a, 10b, 10c and 10d are the graphs showing the relationship between the inclination of the slope and the vehicle speed at various shift positions.
Figure 10B:
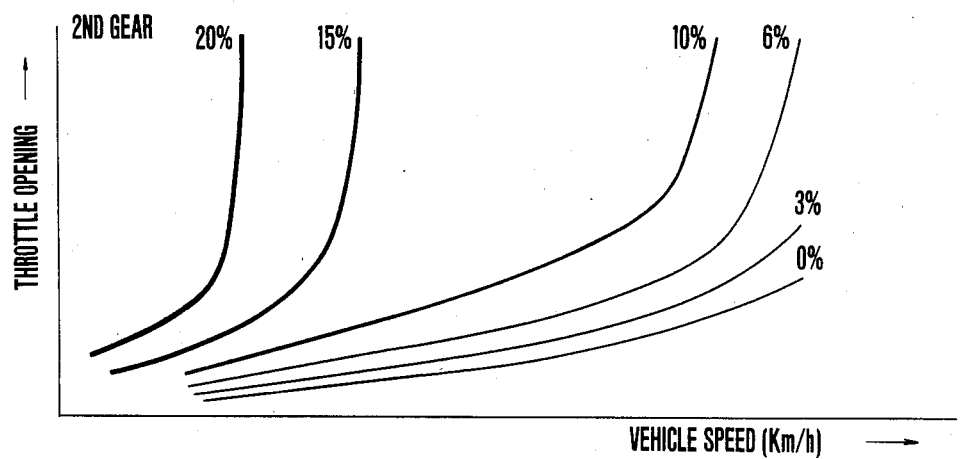
Figure 10C:
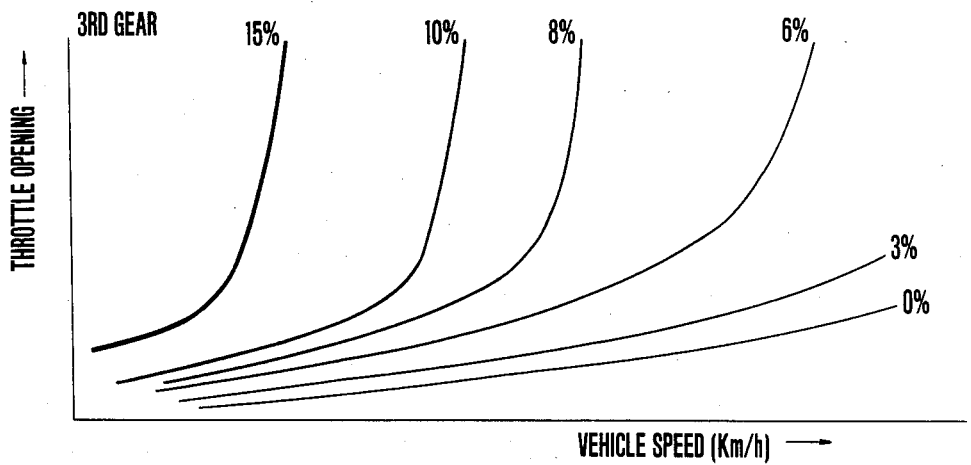
Figure 10D:
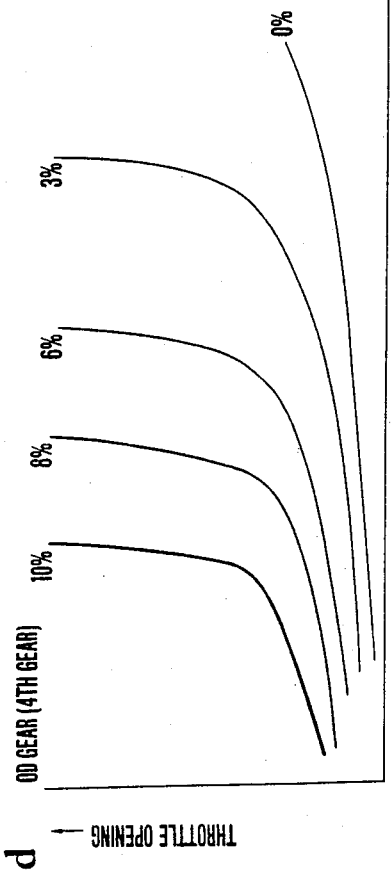

In this embodiment of the present invention, when the vehicle is running on a level road with the shift lever position set in the drive position "D", the boundary speeds at the time of the shift from the 1st speed to the 2nd speed (1-2 shift), shifting 2nd speed to the 3rd speed (2-3 shift), shifting from the 3rd speed to the 4th speed (3-4 shift) and reverse shifts such as (4-3 shift), (3-2 shift) and (2-1 shift) are set to PD001 to PD006 as shown in FIG. 8a, and the values representing the vehicle speeds of PD001 to PD006 are stored in 6 storage areas of ROM 402 respectively, using the throttle openings as the addresses. The pattern shown in FIG. 8a is used as the reference data at the time of speed shifting when a vehicle is running on a level road with the shift lever set in the "D" position; when the vehicle is running on a slope, the reference data for speed shifting is prepared by modifying the pattern depending on the inclination of the slope; when the shift lever is set to "3", "2" and "1", the pattern is altered to the pattern which prevents 3-4, 2-3 and 1-2 shifts, respectively; in other words, the pattern shown in FIG. 8a is the standard pattern. Alteration of this pattern is made when the standard pattern is written in RAM 403 from ROM 402-1 and ROM 402-2 based on the shift lever position POSi or the inclination of the slope (3 kinds: SLOPE 2, SLOPE 4 and SLOPE 8) detected by the interruption program. In other words, when the shift lever is in the position "3", in writing the standard pattern into RAM 403, as shown in FIG. 8b, PD005 and PD006 are re-written into the fixed speed of the vehicle which is not affected by the throttle opening THRO when the shift lever position is "3" and the inclination of the slope is SLOPE 8, or the maximum speed (140 km/h at PD005) obtainable at the 3rd speed position of the vehicle corresponding to the maximum number of revolution of the engine, and when the shift lever position is "2" and the inclination of the slope is SLOPE 4, in writing into RAM 403 as shown in FIG. 8c, PD005, PD006, PD003 and PD004 are re-written into the fixed vehicle speed not affected by the throttle opening THRO, or the maximum speed obtainable at the 2nd and 3rd speed positions of the vehicle corresponding to the maximum number of the revolution of the engine, in order to prepare the reference data for the speed change. Similarly, when the shift lever position is "L" and the inclination of the slope is "2", as illustrated in FIG. 8d, all the patterns PD001 to PD006 are written as maximum vehicle speeds which are not affected by the throttle opening THRO but corresponding to the maximum number of revolutions of the engine. The speed change to be made with reference to the patterns PD001 to PD006 corresponding to various modes is made in the following manner.

A sloping road (that is, the load of the vehicle) is detected through the periodical execution of the interruption program based on the output pulse of the frequency divider (FIG. 3); each of the patterns PD001 to PD006 shown in FIG. 8a through 8d is specified based on the result of said detection; in reference to the present speed step SR and the throttle opening 0, for example, when $0=9$ and $SR=2$ respectively, the vehicle speed values $Y1=15$ and $X2=70$ of the boundary patterns PD002 and PD003 in the speed range concerned where $0=9$ are detected, and they are compared with the actual vehicle speed AS; when $AS<15=Y1$, a 2-1 shift instruction is issued (to set the intended gear ratio to the 1st speed); when $AS \geq 70 = X2$, a 2-3 shift instruction is issued (to set the intended gear ratio to the 3rd speed); when $15 \leq AS < 70$, a shift instruction is not issued in order to maintain the present position. When the shift lever position is in other position and the inclination of the sloping road is 8 to 2, two vehicle speeds (for the side of shift to a high speed and the boundary for shift to a low speed) for the patterns PD001 to PD006 of the corresponding modes (see FIGS. 8b through 8d) is selected in reference to the present speed, and the actual vehicle speeds is compared with these vehicle speeds. When the vehicle is running on a level road with the shift lever set to "D", the shift to all the speeds is made automatically, but when the shift lever position is "3", "2" or "L", or when the vehicle is running on a sloping road, the corresponding reference pattern data for the high-speed side or the vehicle speed comparison data is set to the vehicle speed corresponding to the maximum number of revolution of the engine at each gear ratio so that overrun (over-revolution) of the engine can be prevented even when the driver, for example, accelerates the vehicle with its shift lever set in the position "3" until the maximum speed at the 3rd speed position is reached, since the system is so designed that shift of the speed takes place at such a point. The shiftdown patterns PD002, PD004 and PD006 are provided for obtaining an appropriate engine braking effect. As described above, the shiftup patterns as the reference data are fixed at the high vehicle speeds regardless of the throttle valve opening, thereby hunting due to temporary shift of the speed when climbing a sloping road can be avoided.

For reference, further details of the above-mentioned selection of the gear ratio are given below. When SLOPE=2 (see FIG. 8d), running on a sloping road at the 2nd speed is not appropriate in terms of the gear ratio, and thus the patterns PD001 to PD006 are determined so that the vehicle can run at the 1st speed (see FIG. 8d). Thus, 1-2 shift point X1 and 2-1 shift point Y2 are fixed to the high-speed side (In the examples shown in FIG. 8d, X1=65 km/h, Y2=96 km/h, X3=140 km/h, Y3=129 km/h) respectively. When SLOPE=4, running on a sloping road at the 3rd speed is not appropriate in terms of the gear ratio, and thus each pattern is determined so that the vehicle can travel at the 2nd or the 1st speed. Thus, as for 1-2 shift and 2-1 shift, the shift patterns PD001 and PD002 for shift on a level road are used, and 2-3 shift point X2 and 3-2 shift point Y2 are fixed to the high-speed side (In the example shown in FIG. 8c, X2=106 km/h, Y2 =96 km/h). As in the case of SLOPE=2, 3-4 shift point X3 and 4-3 shift point Y3 are fixed to the side of the speeds higher than those of X2 and Y2. When SLOPE=8 (FIG. 8b), running at the 4th speed is not appropriate in terms of the gear ratio, and thus each pattern is determined so that the vehicle can travel at the 3rd, 2nd or 1st speed. Thus, as for 1-2 shifting, 2-1 shifting, 2-3 shifting and 3-2 shifting, the shift patterns PD001 to PD004 for the level road are used, and 3-4 shifting point X3 and 4-3 shifting point Y3 are fixed to the high-speed side (In the example shown in FIG. 8b, X=140 km/h, Y3=129 km/h).

The shift lever position read as POSi2 by the shift lever position sensor 410 is stored in RAM 403 or the specified address of the internal RAM of CPU 401, and the POSi2 stored previously is stored in the memory address of POSi1 as the previous shift lever position. When the shift lever is set to "N" or "R", the program returns to its head, without any change, but before that necessary control is made for the solenoids 320 and 330. The present shift position is stored in RAM 403 or the specified address of the internal RAM of CPU 401.

In the embodiment of the present invention, the shifts include 4 shifts for the 1st speed (1st), 2nd speed (2nd), 3rd speed (3rd) and 4th speed (4th: Overdrive: OD), and thus there are 3 shift points to be compared.

For example, when the present speed is at the 1st speed, and if the actual shifting is disregarded, possible shifts are 1-2 shifting, 1-3 shifting and 1-4 shifting.

When the present speed is at the 2nd speed, possible shifts are 2-1 shifting, 2-3 shifting and 2-4 shifting. When the present speed is at the 3rd speed, possible shifts are 3-4 shifting, 3-2 shifting and 3-1 shifting. When the present speed is at the 4th speed, possible shifts are 4-3 shifting, 4-2 shifting and 4-1 shifting.

As explained in the above, three shift points are available for the present speed. When these three shifting points are given as PAX1, PAX2 and PAX3, three necessary shifting points (PAX1, PAX2, PAX3) for the present speed can be determined from the six shifting points (1-2:X1, 2-1: Y1, 2-3: X2, 3-2: Y2, 3-4: X3, 4-3: Y3), and these relationships are shown in the following table 4.

TABLE 4

| Shift point | Present Speed | | | |
| --- | --- | --- | --- | --- |
| | 1st speed | 2nd speed | 3rd speed | 4th speed |
| PAX1 | X1 | Y1 | Y1 | Y1 |
| PAX3 | X2 | X2 | Y2 | Y2 |
| PAX3 | X3 | X3 | X3 | Y3 |

The change of the shift point by the shift lever position is fixed as shown in FIGS. 8a and 8b (FIG. 8a shows the example of (D) range, and FIG. 8b, the example of (3) range). When the shift lever position is (D), no change is made. When the shift lever position is (3), PAX3 (3-4 shift point) is fixed on the high-speed side (ex. 223 km/h) so that 3-4 shift does not take place. When the shift lever position is (2), PAX2 (2-3 shift point) and PAX3 (3-4 shift point) are fixed on the high-speed side so that 2-3 shift and 3-4 shift does not take place as shown in FIG. 8c. When the shift lever position is (L) range, PAX1 (1-2 shift point), PAX2 (2-3 shift point) and PAX3 (3-4 shift point) on the high-speed side so that 1-2 shift, 2-3 shift and 3-4 shift does not take place as shown in FIG. 8d. Then, the vehicle speed (RAM) is compared with the three shift points to determine the gear ratio depending on the speed of the vehicle at that time.

The shift position is dependent on the vehicle speed (RPM), shift lever position (POSi2) and the road condition (SLOPE i.e. load of the vehicle). When the next shift position relative to the present shift position is determined in this manner, the setting for actuating the solenoids 320 and 330 is as shown in Table 3.

Here, description of the aforementioned interruption is provided. As described previously, this interruption is intended for the detection of the inclination (detection of the load of vehicle) and release of the inclination (renewal of the value of detected load of vehicle). To explain the detection of the inclination, the equation of the motion for a running vehicle can be given as follows:

$$T = \mu_r W + \mu_a S V^2 + \mu W/100 + 0.278(W + \Delta W) g \cdot dV/dt \quad (1)$$

where
T: Tractive force
$\mu_r$: Rolling friction coefficient
$\mu_a$: Air resistance coefficient
W: Vehicle weight (kg)
$\Delta W$: Weight of rotating parts of vehicle (kg)
S: Projected area of front of vehicle (m²)
V: Vehicle speed (km/h) dV/dt: Acceleration of vehicle (km/h sec)
$\alpha$: Inclination of road surface (%) ($\alpha$=sin B, B: Inclination angle of road surface)
g Acceleration of weight (9.8 m/sec²)

When the tractive force of the vehicle running on a level road is given as TO, the following equation is derived from Rq. (8).

$$TO = \mu_r W + \mu_a S V^2 \quad (2)$$

Figure 9A:
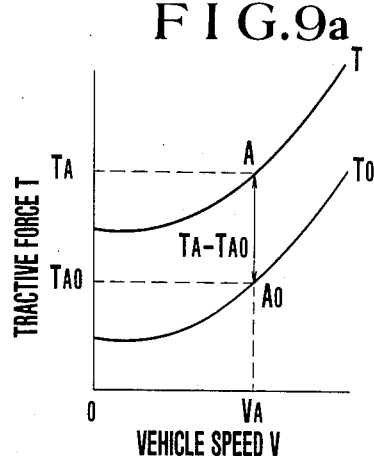
FIG. 9a is a graph showing the relationship between the tractive force and vehicle speed.

The relationship between Eqs. (1) and (2) represented by T-V diagram is shown in FIG. 9a. Assuming a running condition A on the curve T, the vehicle speed and the tractive force of the vehicle can be given as $V_A$ and $T_A$ respectively. The stable running condition at the constant speed $V_A$ is represented by the running condition $A_o$ and $T_o$ curve, and the tractive force by $T_{Ao}$. The difference in the tractive forces $T_A - T_{Ao}$, the difference between the traction force in the running condition A and that in the running condition $A_o$, can be presented by the load of the vehicle compared with the condition of running on a level road, and, from Eqs. (1) and (2), it can be expressed by the following equation:

$$T_A - T_{Ao} = \alpha W/100 + 0.278(W + \Delta W)g \cdot dV/dt \quad (3)$$

The relationship given by Eq. (3) can be represented by a straight line $L_A$ as shown in FIG. 9b if expressed on a $\alpha$ vs dV/dt diagram.

Figure 9B:
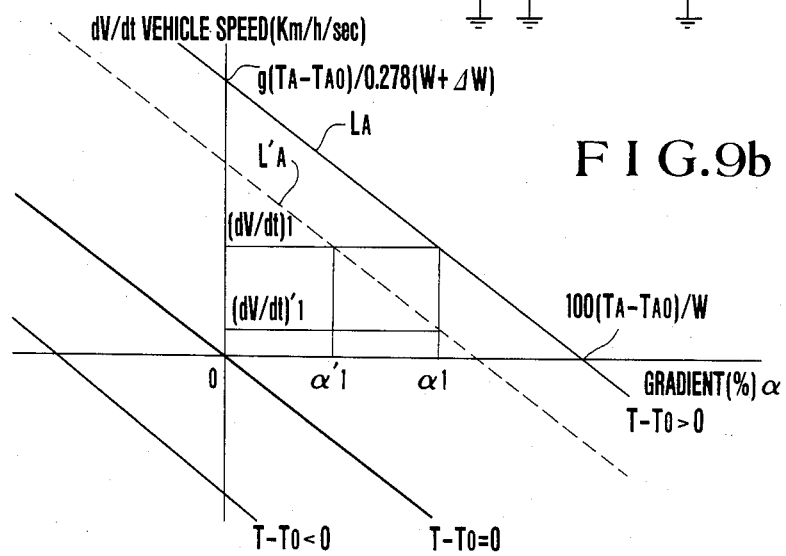
FIG. 9b is a graph showing the relationship between the inclination of the slope and the acceleration.

Naturally, in FIG. 9b, the condition of running on a level road is represented by the origin O, and it is clear tha all other running conditions can be expressed on the same basis in FIG. 9b.

When the running condition is A and the vehicle is running on a level road, as seen from FIG. 9b, the vehicle is in an accelerating state, which can be expressed by:

Accelerations g $(T_A - T_{Ao})/(0.278(W + W))$, and when the acceleration is O, the vehicle is considered to be running on a sloping road whose inclination is 100 $(T_A - T_{Ao})/W$.

Similarly, when the inclination of the road surface is $\alpha_1$, the acceleration is (dV/dt). Thus, under any running condition, the inclination of the slope can be determined by detecting the tractive force T and the acceleration dV/dt.

In the foregoing description, it was implied that the vehicle weight W is constant, but, as is clear from Eq. (3), the vehicle weight W as the load on the vehicle is equivalent to the inclination $\alpha$ and the acceleration dV/dt. In the diagram, the dotted line $L_A'$ represents the weight greater than that represented by $L_A$. As for $L_A$ and $L_A'$, even when the same acceleration $(dV/dL)_1$ is detected, it can be considered tha the vehicle is running on a different slope such as $\alpha_1'$. Thus, when the vehicle is running on the same slope $\alpha_1$, different accelerations $(dV/dt)_1$ and $(dV/dt)_1''$ are detected.

Thus, the vehicle weight is not be considered in the following discussion, and description will be given as to the mode of detecting a sloping road to control speed change, but it is obvious that the expression "sloping road" also reads the "vehicle weight" or "combination of the condition of a sloping road and the vehicle weight", and the detection of the slope condition corresponds to the detection of the load of the vehicle. This is the principle of the slope condition detection.

As for the data concerning the tractive force T, such can be substituted by the data for the torque of the driving wheel shaft, opening of the throttle valve, negative pressure of the intake manifold, etc.

Figure 11C:
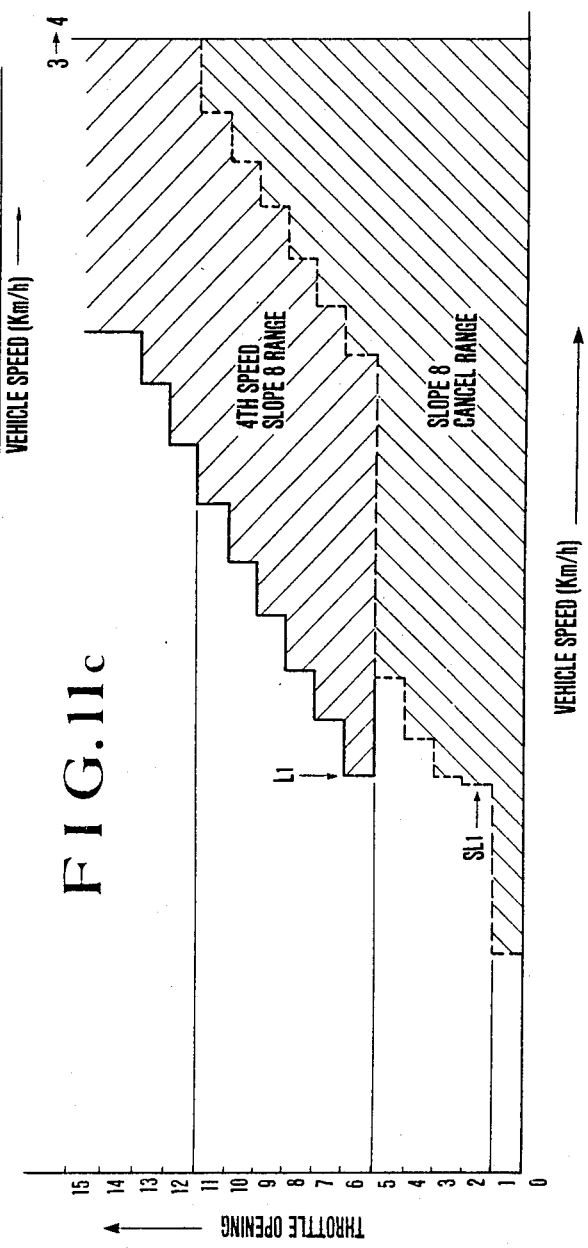
FIGS. 11a, 11b and 11c are graphs showing the ranges for running on a slope and the ranges for running on a level road at various shift positions.
Figure 11A:
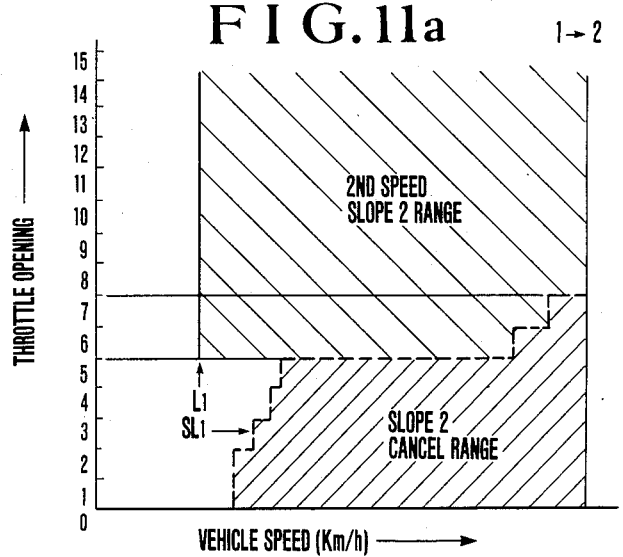
Figure 11B:
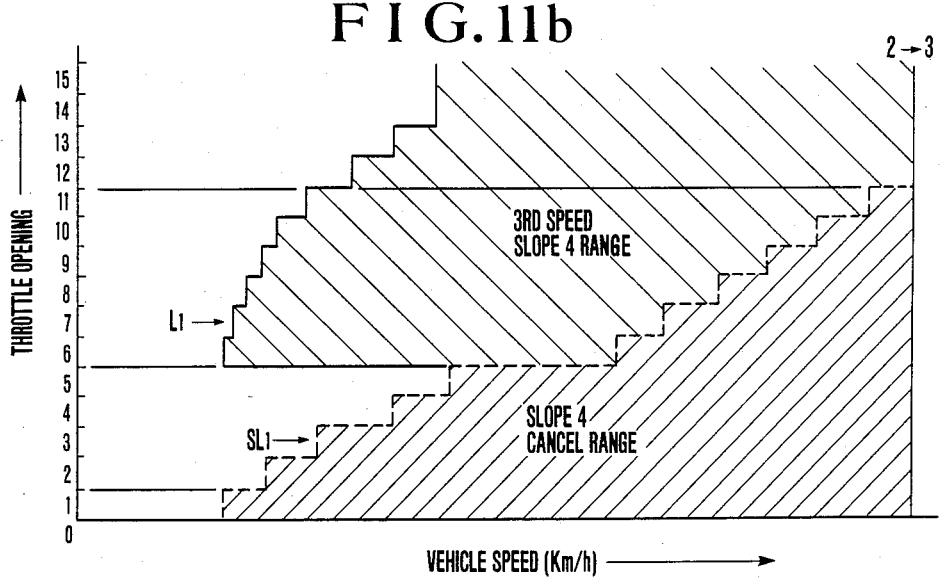

The following description concerns the throttle opening. FIGS. 10a, 10b, 10c and 10d show various running conditions at each gear ratio of throttle valve opening vs vehicle speed diagrams. FIGS. 11a, 11b and 11c show the slope running ranges and the level road running ranges in various shift positions. As seen from these diagrams, the slope running range, level road running range (cancellation condition range) and slope-descending range are determined by the throttle opening and the vehicle speed; as for each of these ranges, the vehicle speed on the low speed side and the vehicle speed on the high speed side are stored in ROM 401-1 and ROM 401-2 as reference data using the throttle opening as an address; in detecting data concerning the slope, the shift position for running is determined with reference to the data stored in the register; the actual vehicle speed is compared with data concerning $L_1$ on the low speed side for running on the slope in said shift position corresponding to the throttle opening stored in ROM in order to determine whether or not (the present shift position) is appropriate for running on the slope. As for the detection of the cancellation condition and the cancellation of the condition for running on the slope, whether or not the presently-held slope condition detection data is stored in any of SLOPE=8,4 and 2; whether or not the shift position for the level road running is possible is judged by checking if the actual vehicle speed is higher than the low-speed side $SL_1$ of the vehicle speed data as the condition for the cancellation of the ROM data; when the condition for the cancellation is satisfied, the condition for the slope running (see FIG. 8b, 8c or 8d) is cancelled. In other words, the reference data for the speed change is returned to the condition shown in FIG. 8a. As explained in the foregoing, shift-up from each shift position is limited within the range depending on each shift position so that the frequent shift up and down at the time of the running on a slope or depending on the load condition can be prevented.

Thus, the problems of the conventional automatic transmission such as slowdown which occurs simply by stepping on the acceleration pedal or that the poor engine braking effect causes frequent use of the brake and the resultant wear of the brake can be solved by providing the vehicle with the transmission control system which enables smooth and rationalized automatic transmission control, that is, speed change control matching with the condition of the slope and the load of the vehicle, since such system enables the vehicle to be operated at the running speed which does not cause hunting and to obtain acceleration and deceleration characteristics matched with the inclination of the slope or the vehicle weight.

In order to prevent the impact occurring when shifting the position of the shift lever from N to D, or from N to D, the transmission system is so designed that the switching for the application of the power can be delayed by a certain period of time, for example, for one second from the time of the shift of the position of the shift lever when making the shift from N to D (see Table 3) or from N to R (Table 3) for the solenoid valves 320 and 330. This one second of delay can be obtained by executing the timer program of 0.01 second 100 times.

Figure 10E:
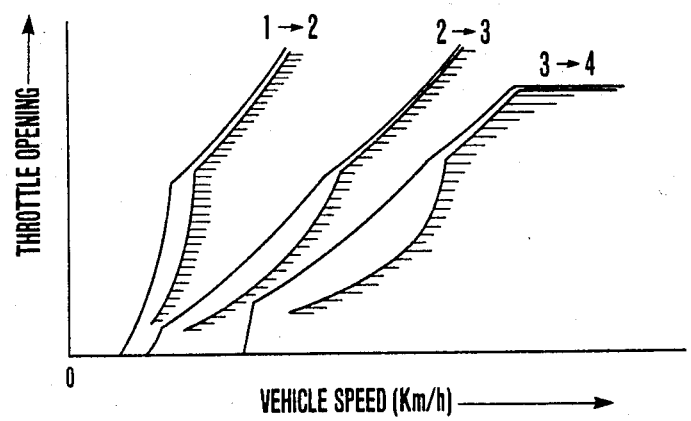
FIG. 10e is a graph showing the appropriate range for the lockup which depends on the vehicle speed, throttle opening and shift position.

Each shift position has a range in which the lockup operation is advantageous, and the range is shown in FIG. 10e. The solid line represents the boundary of the speed change, and the ranges marked with slant lines, from left to right, represent those in which the lockup operation at the 2nd, 3rd and 4th speeds are advantageous. At the 1st speed, the range in which the lockup operation is advantageous is relatively small, and the shift to the 2nd speed takes place immediately, so soon that the lockup cancellation operation which involves the connection to a torque converter is actuated without the lockup operation. For this reason, the range in which the lockup drive is advantageous is not shown for the 1st speed range.

Figure 10F:
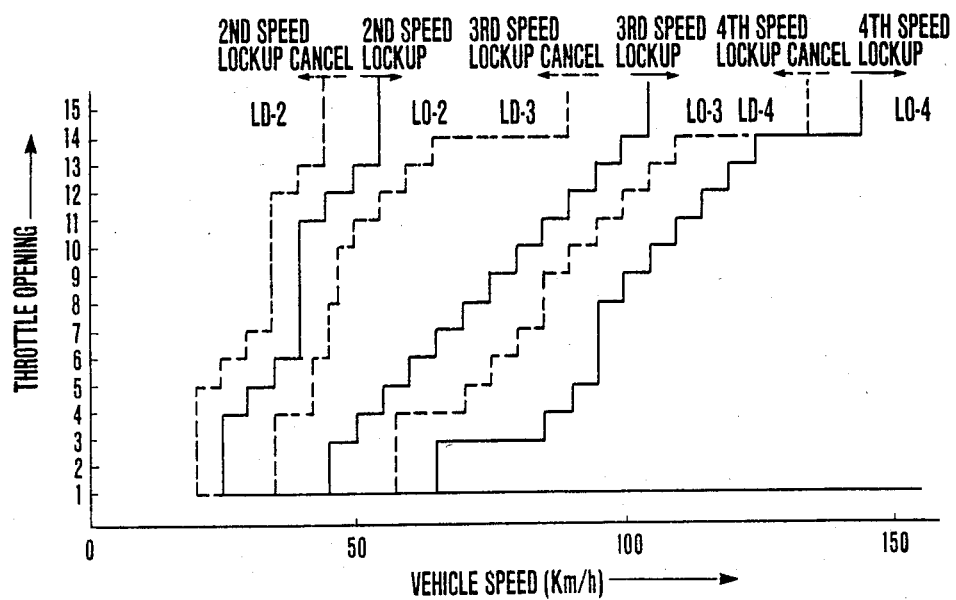
FIG. 10f is a graph showing the quantified lockup operation boundary and the lockup cancellation boundary which are necessary to allow lockup operation only within the appropriate range for lockup.

FIG. 10f shows the ranges of the lockup drive determined corresponding to each of the shift positions having such ranges in which the lockup drive is advantageous. In FIG. 10f, the solid lines represent the boundaries of the lockup at the 2nd, 3rd and 4th speeds from left respectively, while the dotted lines indicate the boundaries of the cancellation of the lockup at the 2nd, 3rd and 4th speeds from the left, respectively.

As explained above, the boundary of the lockup and that of the cancellation of the lockup are separated to prevent an unstable condition resulting from the alternatingly occurring lockup and the cancellation of the lockup. By determining the boundary of the lockup and that of the cancellation of the lockup in the above-mentioned manner, both the lockup and the lockup cancellation can be done automatically by referring to the boundaries at more than two shift positions.

As for the boundaries shown in FIG. 10, the lowest vehicle speed to be locked up is stored in the fixed ROM using the throttle opening as the address.

For the convenience of the following explanation, the storage areas of ROM for the lockup boundary and the lockup cancellation boundary at various shift positions are called tables, and these tables are named as shown in Table 5.

TABLE 5

| Table | Contents of Memory |
|---|---|
| Table $A_{LU}$ | Min. vehicle speed to be locked up at 2nd speed. |
| Table $B_{LU}$ | Min. vehicle speed to be locked up at 3rd speed. |
| Table $C_{LU}$ | Min. vehicle speed to be locked up at 4th speed. |
| Table $A_{TC}$ | Max. lockup vehicle speed to be cancelled at 2nd speed. |
| Table $B_{TC}$ | Max. lockup vehicle speed to be cancelled at 3rd speed. |
| Table $C_{TC}$ | Max. lockup vehicle speed to be cancelled at 4th speed. |

When the vehicle is running at the 2nd speed, whether or not the speed is locked up is checked; when the 2nd gear speed is locked up, table ATC is specified; the maximum speed of table$_{TC}$ is read using the throttle opening at that time as the address to compare it with the vehicle speed at that time; when the latter is lower than the former, the lockup is cancelled (release of the direct-coupled clutch); when the latter is higher than the former, the lockup condition continues. When the lockup is cancelled, table $A_{LU}$ is specified, and the minimum speed of table$_{ALU}$ is read out using the throttle opening at that time as the address to compare it with the vehicle speed at that time; when the latter is higher than the former, the lockup is actuated (direct-coupled clutch ON); when the latter is lower than the former, the cancelled condition of the lockup is continued.

In the case of the 3rd gear speed, when the speed is locked up, table $B_{TC}$ is referred; when the lockup is cancelled, table$_{CLU}$ is referred. In the case of the 4th gear speed, when the speed is locked up, table $C_{TC}$ is referred, and when the lockup is cancelled, table $C_{LU}$ is referred. When the throttle opening is substantially zero, or when the acceleration pedal is released, the lockup is cancelled, or the connection with the torque converter is made to prevent the engine from being subjected to a shock and the resultant abrupt change in the vehicle speed that occurs when the acceleration pedal is released suddenly during the acceleration, or when the engine brake is applied if locked up.

Figure 12A:
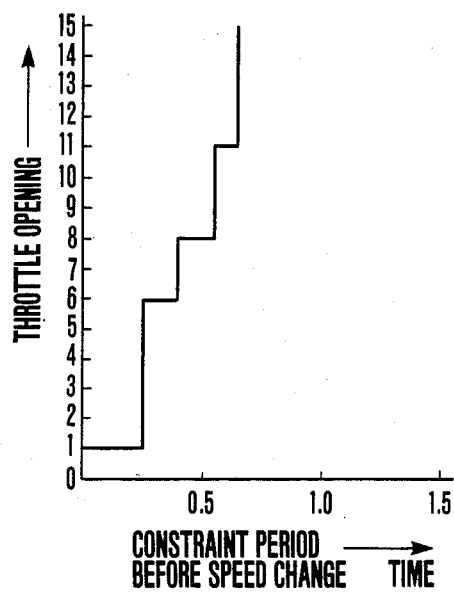
FIG. 12a is a graph showing the constraint time of the throttle opening between the cancellation of the lock-on and the start of the speed change.
Figure 12B:
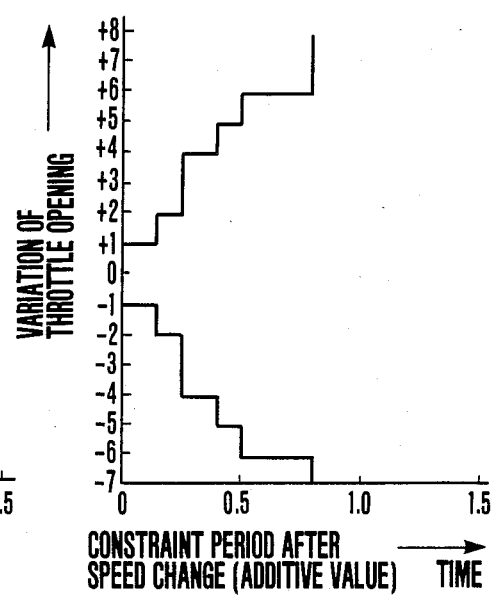
FIG. 12b is a graph showing the constraint time concerning the throttle opening and the acceleration.
Figure 12C:
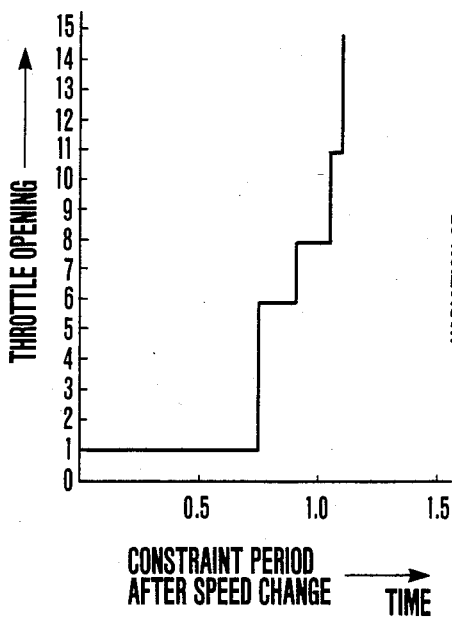
Figure 12D:
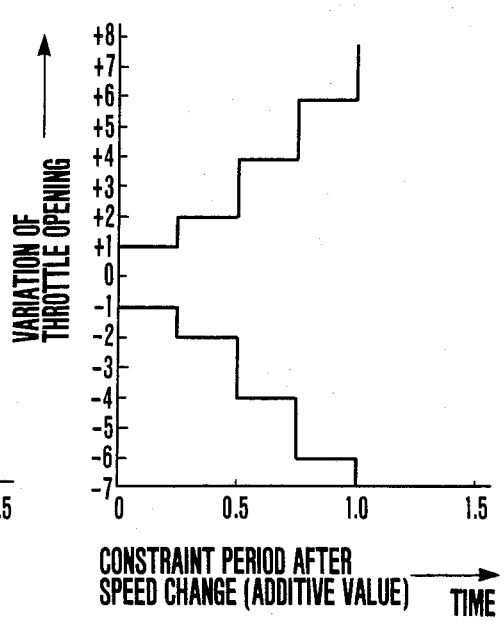
FIG. 12d is a graph showing the constraint time concerning the throttle opening acceleration.

The lockup is cancelled when the throttle opening is zero, and the cancellation is effective during the specified period of time from immediately before to immediately after the speed change. The time limit for the cancellation of the lockup before the speed change (time from the cancellation of the lockup to the speed change) and the time limit for the restraint of the lockup cancellation (time required for making judgment whether or not the lockup is necessary after the speed change) are both determined using the throttle opening and the variation of the throttle opening as variables (addresses) as illustrated in FIGS. 12a to 12d, and they are stored in ROM 402. In the case of "speed change", the throttle opening is first stored in RAM 403 or the internal RAM of CPU 401, then, the throttle opening after 0.1 seconds is considered to determine the variation of the throttle opening by deducting the throttle opening from said throttle opening; the variation of the opening is stored in RAM 403 or the internal RAM of CPU 401; the data shown in FIG. 12a is read out from the ROM 402 using the present throttle opening as the address; the data shown in FIG. 12b is read out from the ROM 402 using the variation of the throttle opening as the address; the time limit is set for the value as the sum of the aforementioned values; the speed change is made when the set time limit is reached by running the time limit program of 0.1 seconds repeatedly. When the speed change is made, the throttle opening is read as explained previously to determine the variation of the throttle opening; the data shown in FIGS. 12c and 12d are read out from the ROM 402; the time limit is set based on these data; when the time limit is over, control of the lockup in the shift position changed for the speed change is started. In this manner, the time limit for the lockup cancellation and the time limit for constraint of the cancellation are determined based on the throttle opening and the variation ratio of the throttle opening in order to reduce the shock at the time of the speed change and the lockup.

The overall operation of the above-mentioned embodiment of the present invention will be described in the following in reference to a flowchart. The data stored in the fixed ROM 402 referred for each of the actions explained in the foregoing is summarized; the storage area of each data is referred to as a table or a fixed register for convenience of explanation; the contents of various memories being shown in Table 6.

TABLE 6

| Storage area No. of ROM 402 | Table or fixed register | Data stored in ROM 402 |
|---|---|---|
| 1 | Table $A_{LU}$ | Min. vehicle speed to be locked up at 2nd gear speed. (LO-2 in FIG. 10f) |
| 2 | Table $A_{TC}$ | Max. vehicle speed while lockup cancellation is to be made at 2nd gear speed. (LD-2 in FIG. 10f) |
| 3 | Table $B_{LU}$ | Min. vehicle speed to be locked up at 3rd gear speed. (LO-3 of FIG. 10f) |
| 4 | Table $B_{TC}$ | Min. vehicle speed for which lockup cancellation is to be made at 3rd gear speed. (LD-3 of FIG. 10f) |
| 5 | Table $C_{LU}$ | Min. vehicle speed to be locked up at 4th gear speed. (LO-4 in FIG. 10f) |
| 6 | Table $C_{TC}$ | Min. vehicle speed for which lockup is to be cancelled at 4th gear speed. (LO-2 in FIG. 10f) |
| 7 | Table $D_1$ | Min. vehicle speed at which 1-2 shift is to be made. (PD0001 in FIG. 8a) |
| 8 | Table $D_2$ | Max. speed at which 2-1 shift is to be made. (PD002 in FIG. 8a) |

TABLE 6-continued

| Storage area No. of ROM 402 | Table or fixed register | Data stored in ROM 402 |
|---|---|---|
| 9 | Table $D_3$ | Min. vehicle speed at which 2-3 shift is made. (PD003 in FIG. 8a) |
| 10 | Table $D_4$ | Max. vehicle speed at which 3-2 shift is made. (PD004 in FIG. 8a) |
| 11 | Table $D_5$ | Min. vehicle speed at which 3-4 shift is made. (PD005 in FIG. 8a) |
| 12 | Table $D_6$ | Max. vehicle speed at which 4-3 shift is made. (PD006 in FIG. 8a) |
| 13 | Table $E_1$ | Min. vehicle speed of SLOPE 2 (L1 in FIG. 9a). |
| 14 | Table $E_2$ | Min. vehicle speed for cancellation of SLOPE (SL1 of FIG. 9a). |
| 15 | Table $F_1$ | Min. vehicle speed of SLOPE 4 (L1 in FIG. 9b). |
| 16 | Table $F_2$ | Min. vehicle speed for cancellation of SLOPE 4 (SL1 in FIG. 9a). |
| 17 | Table $G_1$ | Min. vehicle speed of SLOPE 8 (L1 in FIG. 9c). |
| 18 | Table $G_2$ | Min. vehicle speed for cancellation of SLOPE 8 (SL1 in FIG. 9c). |
| 19 | Fixed register $H_1$ | Vehicle speed at which 1-2 shift is restrained (PD001 in FIG. 8d). |
| 20 | Fixed register $H_2$ | Vehicle speed at which 2-1 shift is restrained (PD002 in FIG. 8d). |
| 21 | Fixed register $H_3$ | Vehicle speed at which 2-3 shift is restrained (PD003 in FIG. 8d). |
| 22 | Fixed register $H_4$ | Vehicle speed at which 3-2 shift is restrained (PD004 in FIG. 8d). |
| 23 | Fixed register $H_5$ | Vehicle speed at which 3-4 shift is restrained (PD005 in FIG. 8d). |
| 24 | Fixed register $H_6$ | Vehicle speed at which 4-3 shift is restrained (PD))6 in FIG. 8d). |
| 25 | Fixed register J | Time limit value for preventing the shock at N-D, N-R shifts (Data show-100-time execution of 0.01 second unit program timer). |
| 26 | Table Ka | Time limit value (Number of times of execution of 0.01 second unit program timer) in FIG. 12a. |
| 27 | Table Kb | Time limit value (Number of times of execution of 0.01 second unit program timer) in FIG. 12b. |
| 28 | Table Kc | Time limit value (Number of times of execution of 0.01 second unit program timer) in FIG. 12c. |
| 29 | Table Kd | Time limit value (Number of times of execution of 0.01 second unit program timer) in FIG. 12d. |

Similarly, the storage areas of RAM 403 or the internal RAM of CPU 401 where data is stored temporarily are referred to as tables or registers for the convenience of explanation, and the data such as shown in Table 7 is stored in these storage areas. Actually, however, different data is temporarily stored in one of the addressed of RAM 403 or the internal RAM of CPU 401 in time series, and thus it should be noted that each storage area is not necessarily assigned for only one or more sets of data. In other words, one or more groups of addresses can be used in time series by using a different table name or register name.

TABLE 7

| Register No. | Register | Content of RAM 403 or internal RAM of CPU 401 — Content of memory |
|---|---|---|
| 1 | THRO register 2 | Throttle opening of the last time. |
| 2 | THRO register 1 | Throttle opening of this time. |
| 3 | Vehicle speed register 2 | Vehicle speed of last time. |
| 4 | Vehicle speed register 1 | Vehicle speed of this time. |
| 5 | POS register 2 | Shift lever position of the last time. |
| 6 | POS register 1 | Shift lever position of this time. |
| 7 | SOL1 register | Energizing (1) and deenergizing (0) of speed change control solenoid valve 320. |
| 7 | SOL1 register | Energizing (1) and deenergizing (0) of speed change solenoid valve 330. |
| 8 | SOL2 register | Energizing (1) and deenergizing (0) of speed change control solenoid valve 330. |
| 9 | SOL3 register | Energizing (1) and deenergizing (0) of lockup control solenoid valve 370. Lockup can be effected by energizing (1). |
| 10 | Timer register N | Number of times of execution of unit program timer read out from fixed register J of ROM 402. |
| 11 | Register Ka | Time limit value read out from table Ka of ROM 402. |
| 12 | Register Kb | Time limit value read out from table Kb of ROM 402. |
| 13 | Register Kc | Time limit value read out from table Kc of ROM 402. |
| 14 | Register Kd | Time limit value read out from table Kd of ROM 402. |
| 15 | Timer register B | Sum of the data of registers Ka and Kb. |
| 16 | Time register A | Sum of the data of registers Kc and Kd. |
| 17 | Shift position register | Speed change value at the present running speed. |
| 18 | SLOPE register | Values of SLOPE 2, 4 and 8. |
| 19 | RAM table $D_1$ | PD001 |
| 20 | RAM table $D_2$ | PD002 |
| 21 | RAM table $D_3$ | PD003 |
| 22 | RAM table $D_4$ | PD004 |
| 23 | RAM table $D_5$ | PD005 |
| 24 | STR register | (1):Close of switch 600 (Instruction of start at 2nd gear speed.) (0):Open of switch 600 (No instruction). |

FIGS. 13a through 13e show the operation of the digital electronic control systems which operate in reference to the tables or the registers shown in Tables 6 and 7. FIGS. 13f and 13g show the operation for the setting of automatic slope data detection and the setting for the cancellation.

The function of the digital electronic control system 400 will be described in the following in reference to the above-mentioned diagrams.

When the ignition key is inserted, power is supplied to the digital electronic control system 400; the system 400 sequentially turns on the power for the components and the circuits to be controlled according to the power supply sequence program data stored in the fixed ROM 402 (see START of FIG. 13a).

Then, all the tables and the registers shown in Table 7 are cleared. Then, as the initial setting, the setting for SLOPE register 2 is made first. This setting is necessary to make sure that the vehicle starts at the 1st gear speed, since the load of the vehicle was not detected immediately after the power is supplied. Shift lever position is read and stored in the register 1 (see the initial setting in FIG. 13a). The operation proceeds to the flow after the (A) marked; the throttle opening, instruction switch for start at the 2nd speed and the vehicle speed are read, and the data that has been read is stored in THRO register 1 and vehicle speed register 1 respectively.

In order to detect the change of the lever position (to "Drive": position) from other lever position (N: Neutral or P: Parking) (the following description is made assuming that the original lever position is "N"), the contents of POS register 1 is first registered in POS 2, and the shift lever position which has been read is stored in POS register 1.

(a) The contents of POS register 1 is checked; when the lever position is "N", the data stored in SOL 1, SOL 2 and SOL 3 registers is cleared since the setting for the drive (change of shift lever position) has not been made, and the solenoid valves 320, 330 and 370 are deenergized.

As explained previously, immediately after the insertion of the ignition key, the above-mentioned registers are cleared; consequently, all the solenoid valves 320, 330 and 370 are deenergized; thus, it is not necessary to clear them again, but these processes are necessary in order to set N condition when the shift lever is shifted from the position other than the N position to the N position.

(b) When POS register 1 is R, and POS register 2 is N (Step 4=YES), the shift lever makes N-R shift (Shift from N to R; the same hereinafter); the shock prevention time limit of ROM register J is provided in the timer register to prevent the shock. Then, the operation return to the step marked with (A) for N setting; R is stored in both POS1 and POS2 at steps 1 and 2, thereby YES is obtained at step 6 through steps 3, 4 and 5; the remainder obtained by deducting 1 from the contents of the timer register N is renewed and stored (countdown); 0.01 second timer program is executed; In the case of timer over, when the content of the register N is no 0 (time over), countdown of the timer register N and the execution of 0.01 second timer program occur again through step (A) and steps 1 to 6. The same process is repeated hereafter.

Figure 13B:
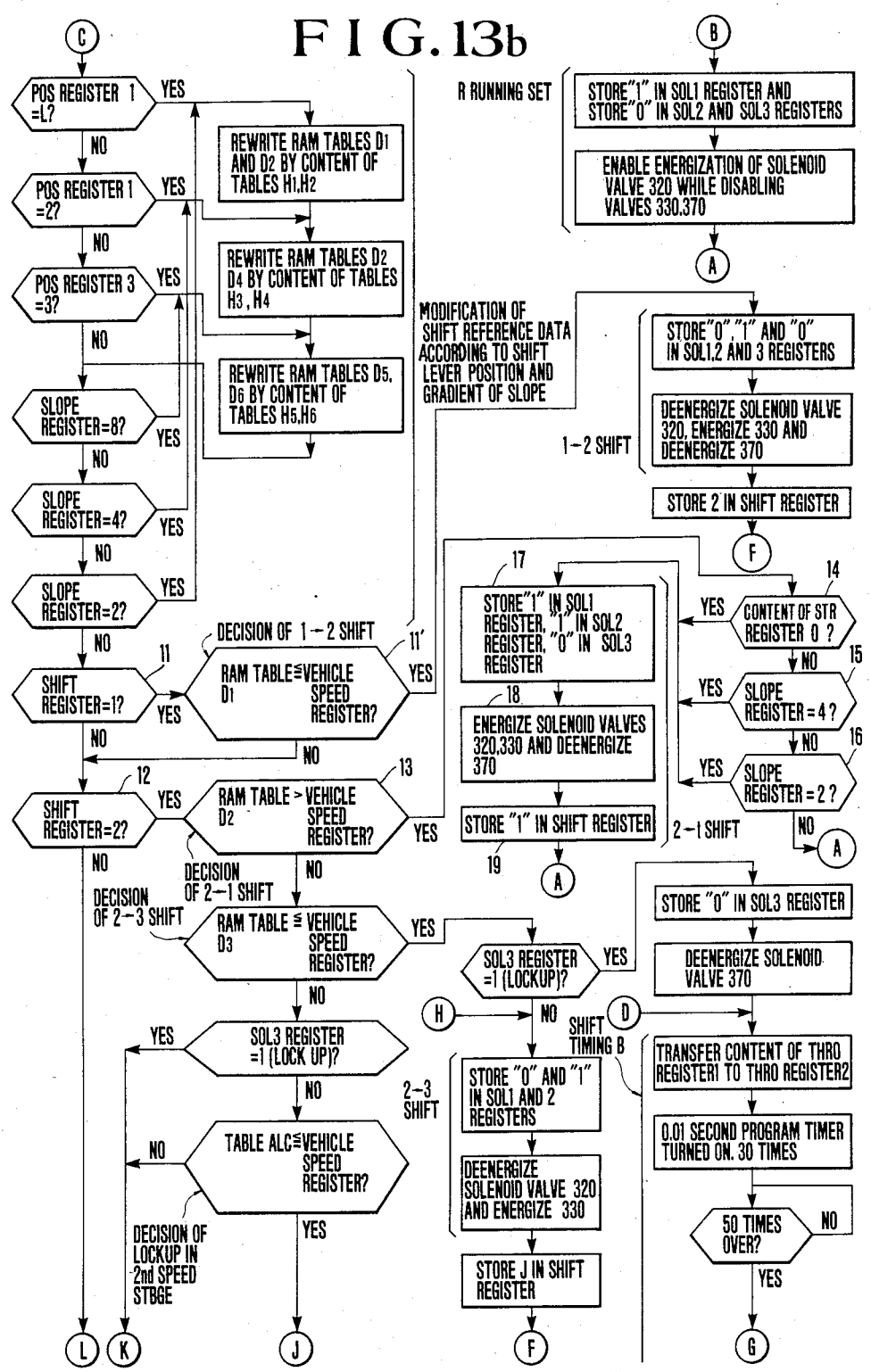
Figure 13D:
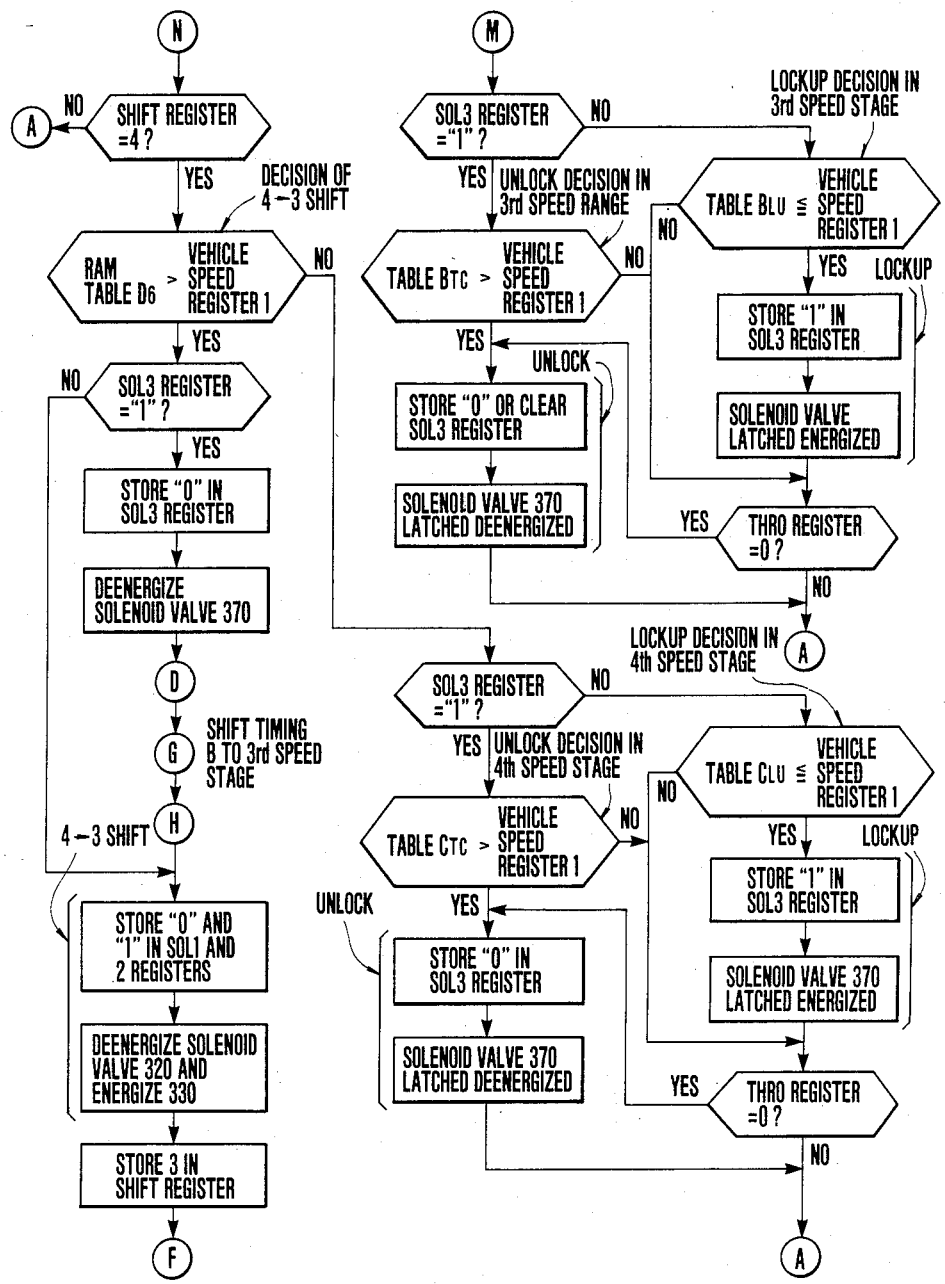
Figure 13E:
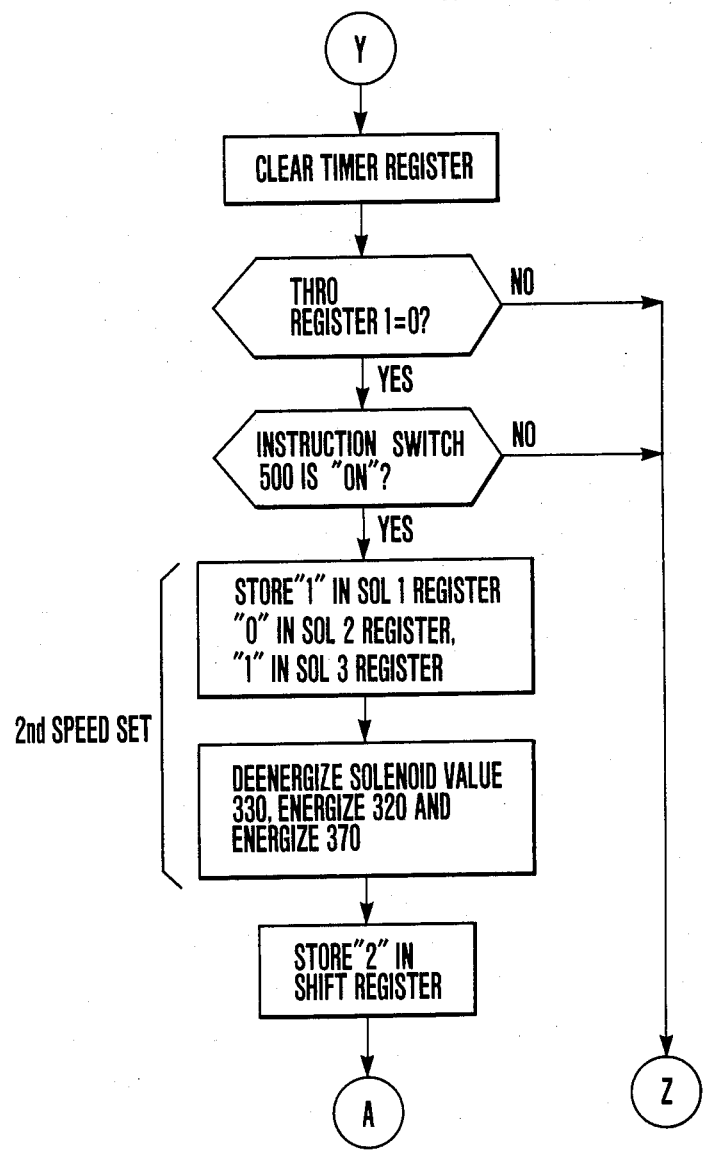
Figure 13F:
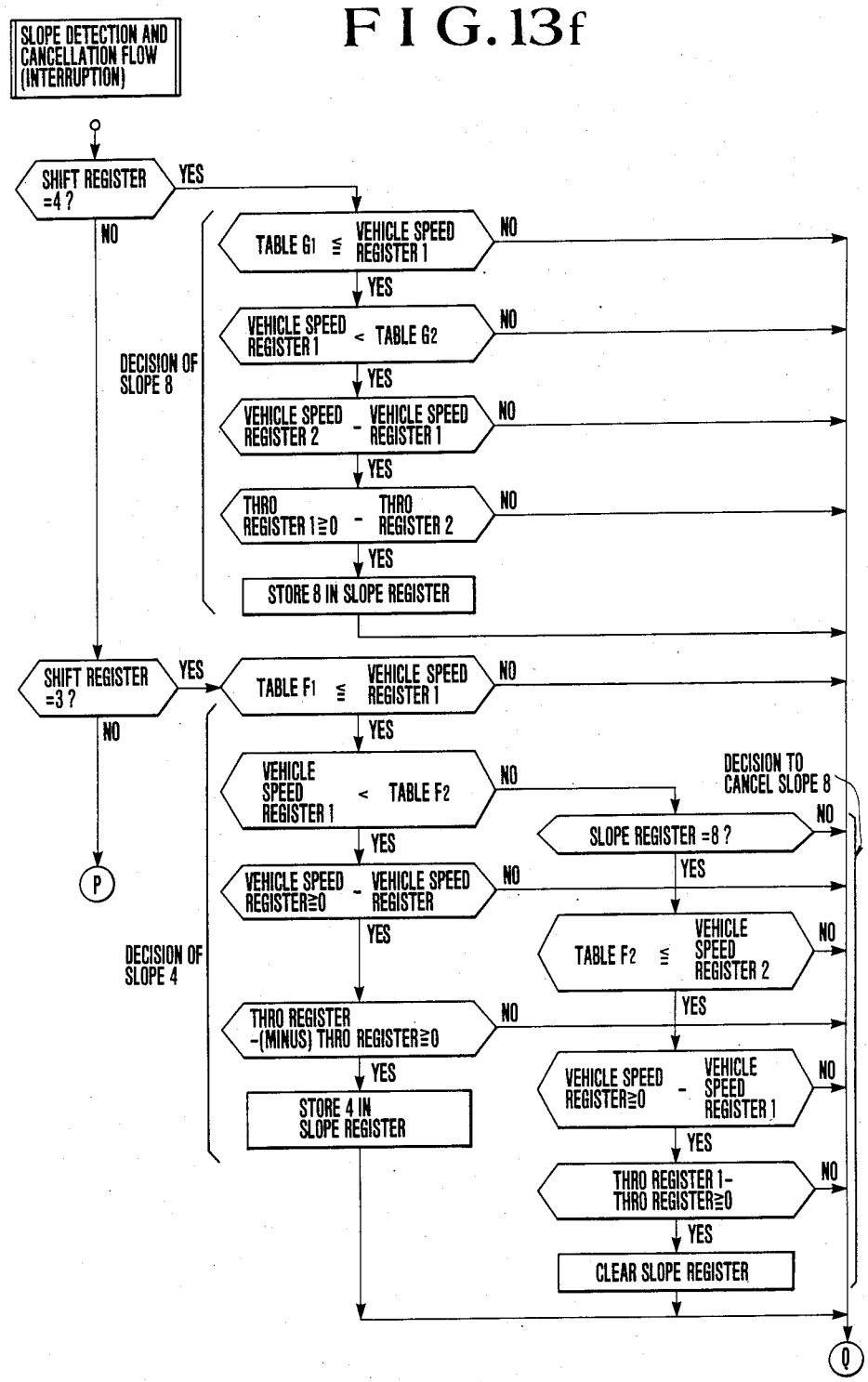
FIGS. 13f and 13g are flow charts showing the operations of detection of slope and cancellation to be performed by the digital electronic control system 400, based on the interruption program data stored in the fixed ROM 402.
Figure 13G:
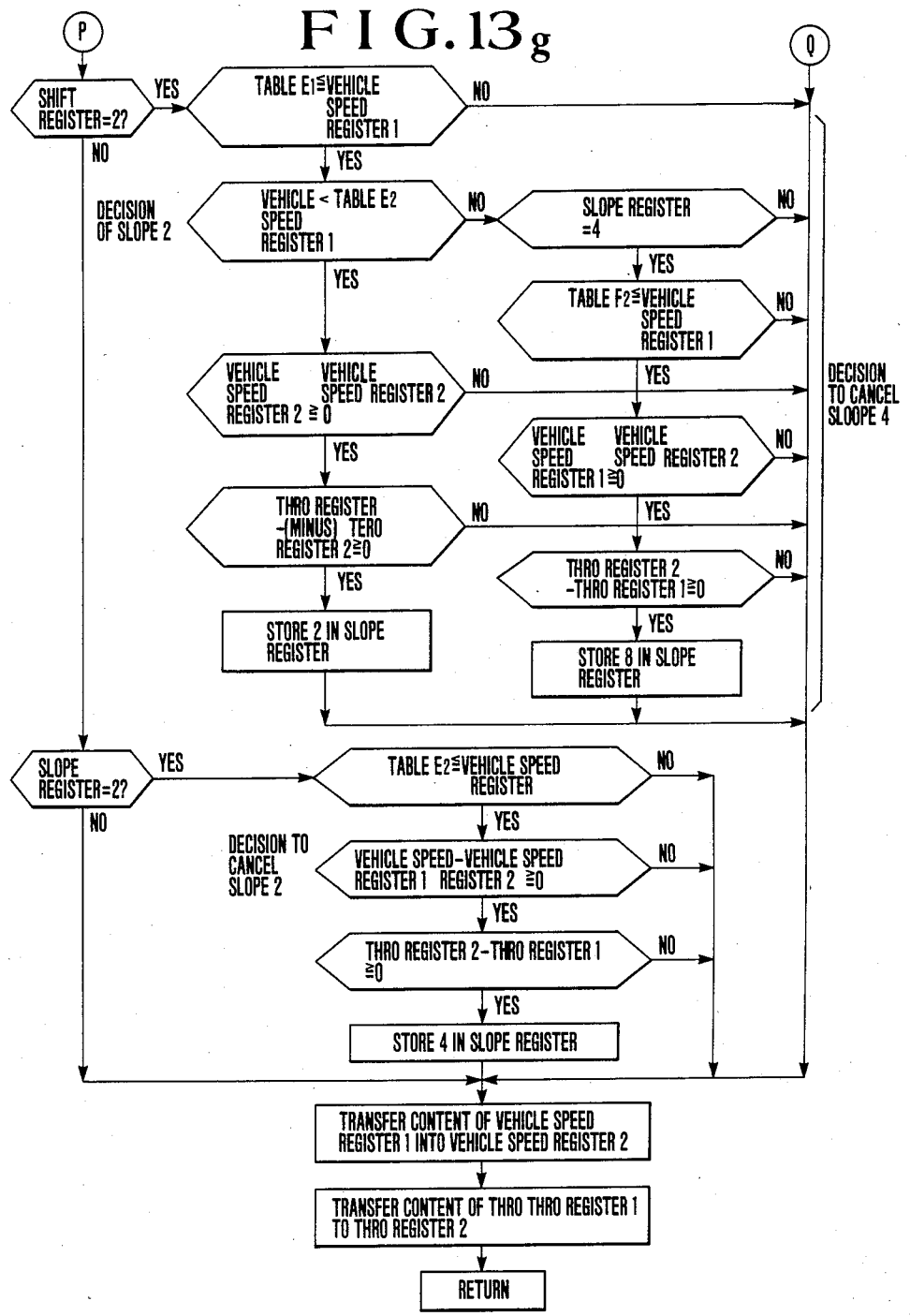

When the memory of the timer register is 0, the shock prevention time has elapsed, and the operation proceed to step (B); and the setting for R-running is made (see step (B)—step (A) in FIG. 13b). When the shift lever position is changed during the aforementioned time-limited action, this always cause the shift lever to be shifted to the N position, and the operation will return to said step (a) again.

(c) When POS register 1 is D and POS register 2 is N (Step (5)=YES), the shift lever is changed from N to D, so the shock prevention time limit of ROM register J is stored in the timer register N. The operation returns to step (A) for N setting; D is stored in both POS 1 and POS 2 registers at steps 1 and 2, thereby YES is caused at step 7 through steps 3 to 6; whether the vehicle has stopped or not is checked; when it is confirmed that the vehicle has almost stopped, "1" indicating the 1st speed is stored to start the shock prevention time limit through steps (V) to (W) (since "2" for the first start from the turning on of the power is set in the SLOPE register, the operation proceed to step (W). When the time is over, the operation proceed to step 10. When the vehicle is not recognized to have stopped almost completely, or when the vehicle has ceased to have stopped almost completely, the operation proceeds to step 10, since start or continuation of the time limit is not required (Shock does not occur in this case).

(d) When the shift lever position is 3, 2 or L, the operation proceeds to step 10 without counting the time limit.

(e) Shift lever position should be detected at one of the steps 3, 6, 7 and 8, but in consideration of the posibility of an error in reading the shift lever position, the system is so designed that the operation returns to step 2 through step 9 if the shift lever position is not detected at any of the steps 3, 6 through 8.

In each of the above actions, the operation for the detection of the shift lever position and the corresponding settings are carried out.

The reference data concerning the automatic transmission for travel on a level road, or standard data is read out from the tables $D_1$ to $D_3$ of ROM and stored in RAM tables $D_1$ to $D_6$ respectively. The data of RAM tables $D_1$ $D_6$ is rewritten depending on the shift lever position and the inclination of the slope (SLOPE 2, 4, 8) (see FIG. 13b). In other words, the standard data shown in FIG. 8a is rewritten into those shown in FIGS. 8b, 8c or 8d. Such rewriting is not made when the shift lever position is D and the road is level. The inclination of the slope is stored in the SLOPE registered during the flow of operation for detection and the cancellation of the slope data to be carried out by interruption (For the details, refer to FIG. 13f and after), and the operation is carried out in reference to the memory data of said SLOPE register.

Automatic transmission control is performed in reference to the RAM tables $D_1$ to $D_6$ and the memory of the shift position register, and automatic lockup control is made with reference to $A_{LU}$, $A_{TC}'$ $B_{LU}'$ $B_{TC}'$ $C_{LU}'$ $C_{TC}$ and the memory data of the shift position register. This flow of control corresponds to step 11 and succeeding steps shown in FIG. 13b.

(f) When the vehicle is running at the 1st speed (Step 11=YES), the vehicle speed in RAM table $D_1$ is read out referring to the throttle opening (memory data of THRO register) as the address and compared with the actual vehicle (data in vehicle speed register 1) to check if it is greater than the latter (step 11'). When the answer is YES, SOL 1 to SOL 3 registers and ON-OFF of the solenoid valve are set to the 2nd speed, and "2" indicating the 2nd gear speed is renewed and stored in the shift position register. At the 1st speed, lockup does not occur, but there is a possibility of lockup occurring at the 2nd speed, so that the operation returns to step (A) through the steps after step (F) (see FIG. 13c) for the time limit of lockup timing A (Minimum time required from the shift to the 2nd speed to the lockup). After returning to step (A), judgment of whether or not lockup should occur is made when YES is confirmed at step 12 through steps 1 to 11, but the time is already over at this point, and thus judgment is "Lockup is necessary"; therefore, even when lockup (SLO 3 register=(1), solenoid valve 370 is electrified) occurs, there is no shock due to the lockup.

(g) When the vehicle is running at the 2nd speed (step 12=YES), the vehicle speed in RAM table $D_2$ is read out referring to the data stored in THRO register 1 as the address to check if it is smaller than the vehicle speed registered in the vehicle speed register 1, or check if shifting to the 1st speed is necessary; when small (when (RAM table $D_2$>vehicle register 1 ?) at the step 2 following the step 12 in FIG. 13b is YES), this means that the speed has been reduced, and thus there is a possibility of stopping of the vehicle. In this case, the content of the STR register is referred; when the registered data is (1) that instructs the start at the 2nd speed, the content of SLOPE register is referred, and when the registered data is 4 or 2, the operation proceeds to 2-1 shift, since the load of the vehicle is large; when the data of the SLOPE register is other than 4 and 2, the operation returns to the flow of step (A), since the load of the vehicle is small, and start at the 2nd speed is possible. When the data registered in the STR register is (0) that does not instruct start at the 2nd speed, the operation proceeds to 2-1 shifting.

When 2-1 shifting occurs, vehicle speed register 1 is stored in the shift position register, and the operation returns to step (A). When the vehicle speed registered in the vehicle speed register 1 is large, the vehicle speed of RAM table $D_3$ is read out to check if the vehicle speed of the vehicle speed register 1 is larger than it, or to check if shifting to the 3rd speed is necessary. When shift to the 3rd gear speed is necessary, it is necessary to check if the memory of SOL 3 register is 1, or if lockup occurs; when the memory is (1), SOL 3 register is cleared to (0) to cancel the lockup, and the time limit for the speed change timing B is set.

In the case of this shift timing B (Steps (D) to (G) in FIG. 13b, and steps (G) to (H) in FIG. 13c), the variation of the throttle opening during 0.5 second (i.e. 50 times 0.01 seconds) is measured, and the time limit value is read from table Kb; using the variation of the throttle opening as the address. Also, the data of the THRO register 1 is used as the address in reading the time limit value from the table Ka; the sum of the both is stored in the timer register B; and the shock prevention timing from the lockup cancellation to shifting (2-3) corresponding to the throttle opening and its variation is controlled by executing the 0.01 seconds timer program for the number of the times indicated by the memory data of the register B.

As for the shift timing, shift to the 3rd speed is made as shown by the flow from step (H) to step (F); 3 is stored in the shift register; the lockup judgment timing A is controlled so that the lockup does not take place at once at the 3rd speed; and the operation return to step (A). The lockup judgment timing A is controlled like the shift timing B, but the time limit values concerning the throttle opening and its variation are for the table Kc and table Kd.

When shift to the 3rd gear speed is not required, whether the lockup is made or not is checked by checking if (1) is stored in SOL 3; when the answer is NO, the vehicle speed of table $A_{LU}$ is read using the throttle opening (memory data of THRO register 1) as the address, to check if the former is larger than the vehicle speed of the vehicle speed register 1; when it is larger, the lockup is necessary; the operation proceeds to step (J) (see FIG. 13c); (1) is registered in the SOL 3 register; solenoid valve 370 is activated to accomplish the lockup.

When the lockup has already occurred and the throttle opening in THRO register 1 is 0, the lockup is cancelled for prevention of shock; when it is not 0, the vehicle speed is read by table $A_{TC}$ using the data of THRO register 1 as the address; whether or not it is smaller than the vehicle speed of the vehicle speed register 1 is checked; when smaller, the lockup is cancelled; when not smaller, the operation returns to step (A) since lockup may be maintained.

(h) When the vehicle is running at the 3rd speed, both the shift judgment control and the lockup judgment control are made in a manner similar to that of the case of the vehicle running at the 2nd speed described in the preceding section (g); however, in the case of the 3rd gear speed, RAM table $D_4$ is referred for the judgment of 3-2 shift; RAM table $D_5$ for the judgment of 3-4 shift; table $B_{LU}$ for the judgment of lockup; and table $B_{TC}$ for the judgment of lockup cancellation (After step (L) in FIG. 13c, and steps (M) to (A) in FIG. 13d).

(i) When the vehicle is running at the 4th speed, the procedure is similar to that described in the previous section (g); RAM table $D_6$ is referred for the judgment of 4-3 shift; there is no shift to a higher speed and no judgment of shifting; table $C_{LU}$ is referred for judgment of lockup; and table $C_{TC}$ for judgment of lockup cancellation.

FIGS. 13f and 13g show the flow of operation for detecting data for running on a slope and its cancellation by interruption, and the flow of the operation for the storage of data concerning the inclination of the slope in the SLOPE register. This flow of operation can be understood more easily by referring FIGS. 11a to 11c.

is a speed between L1 (Table G) and SL1 (Table $G_2$), when running at the 4th speed (see FIG. 11c), the vehicle speed at the time of the last interruption is larger or equal, and the throttle opening at the time of the present interruption is not smaller than that at the time of the last interruption, or if the vehicle is not accelerated, such a condition is regarded as the condition in which the vehicle is not accelerated despite the pressing of the acceleration pedal (or a condition in which the load of the vehicle is too large, or the vehicle is running on a slope), and 8 is stored in the SLOPE register.

(k) In the case of running at the 3rd speed (refer to FIGS. 11b and 11c), the judgment of SLOPE 4 is made similarly to the preceding case of (j), and judgment of the cancellation of SLOPE 8 is made by operation similar to that of (j). The judgment of SLOPE 4 is made similarly to the case of (j) except that tables $F_1$ and $F_2$ are refered. As for the cancellation of SLOPE 8, when the vehicle speed is higher than $SL_1$ (Table $G_2$) (see FIG. 11c), the vehicle speed at the time of the present interruption is higher than or equal to that at the time of the last interruption, and the throttle opening at the time of present interruption is smaller than or equal to that at the time of the last interruption, the vehicle is regarded as running on a level road, and 8 of the SLOPE register is cleared.

(l) In the case of running at the 2nd speed (Refer to FIGS. 11a and 11b), the judgment of SLOPE 2 and the cancellation of SLOPE 4 are made similarly to the preceding case of (k); however, tables $E_1$ and $E_2$ are referred for the judgment of SLOPE 2. When the judgment is made for the cancellation of SLOPE 4, 8 is stored in the SLOPE register. The cancellation of SLOPE 2 is made at the 2nd speed, and the process is similar to that of (k). In the final stage of the slope detection and cancellation flow, the vehicle speed at the time of the present interruption and the throttle opening are stored in the vehicle speed register and THRO register 2 respectively.

As explained in the foregoing, not only at the 4th speed but also at the 2nd and 3rd speeds, the ranges in which the lockup is desirable are stored in advance in the storage unit so that the lockup and the cancellation can be made automatically by referring to these memories. In this system, the lockup is cancelled automatically when the acceleration pedal is released, so that not only the automatic transmission and the engine can be prevented from being subject to a shock but also the variation of the vehicle speed can be reduced.

The control system of the setting for start at the 2nd speed will be described in detail in the following. The data concerning the 2nd speed start instruction switch 600, other switches and sensors are read out simultaneously with the reading of the data of the throttle opening, vehicle speed and the shift lever position. When the 2nd gear speed start instruction switch 600 is closed, (1) is stored in the STR register, and (0) when it is opened.

When the throttle opening is 0 and the vehicle speed is less than 5km/h, that is, when the vehicle has almost stopped, the operation proceeds to the flow shown in FIG. 13a. This condition is valid when the vehicle starts with a throttle opening of 0 and when the vehicle has come to a stop from running. When we consider a case when the vehicle starts with a throttle opening of 0, the operation proceeds to step (W) from the flow shown in FIG. 13a in the first start after power is put to work because 2 is set in the SLOPE register, and it further proceeds to rewriting of tables of steps 10 and onward after the specified delay time and to control of transmission; however, in the second and later starts after turning on the power, start at the 2nd speed is 20 instructed (the contents of STR register=(1)) through the flow ranging from step (V) to step (W) and step X; when the load of the vehicle is small (the content of the SLOPE register is 8 or 0), the operation proceeds to the steps of rewriting tables after the step 10 and to 25 control of speed change through step (X). When start at the 2nd speed is not instructed (the content of STR register=(0)), or when the load of the vehicle is large even if an instruction is given, the operation proceeds to the steps of the rewriting table after step 10 to control of the speed change through step (W) after the specified delay time.

Therefore, if the vehicle is about to start when start at the 2nd speed has been instructed, and the load of vehicle is small, the operation proceeds to the steps of rewriting tables after step 10 and to control of speed change without going through the flow of setting start at the 1st speed and delay timing ranging from step (W) to step (A).

At steps 11 and 12 in the flow following the step 10, the contents of the shift position register are referred; when the contents indicate the 1st, the operation proceeds to speed change control to set the 1st speed in the automatic transmission; when the contents indicate the 2nd, the operation proceeds to speed change control to set the 2nd speed in the automatic transmission. Therefore, if the vehicle stops at the 2nd speed, and start at the 2nd speed is instructed through the flow of the aforementioned step (V) to step (W) and step X at the time of next start and furthermore if the load of the vehicle is small and the operation proceeds to the steps of rewriting tables in the steps 10 and onward and to control of speed change without going through the flow of setting start at the 1st speed and delay timing ranging from steps (W) to (A), the operation proceeds to judgment of 2-1 shift ranging from step 12 to step 13 shown in FIG. 13b. When 2-1 shifting is judged to be necessary at step 13, whether or not the 2nd speed should be continued is judged referring to the content of the STR register (to check if the instruction for start at the 2nd speed is given) and the load of the vehicle (the content of the SLOPE register); when the instruction for start at the 2nd speed is given, and also when the load of the vehicle is small, the operation returns to step (A), since the 2nd speed position 15 maintained in this case; and when the instruction for start at the 2nd speed is not given, and also when the load of the vehicle is large, the operation returns to step (A) after making 2-1 shift ranging from step 17 to step 19. When the vehicle proceeds from running to stop through the flow of steps 12 to 16, the transmission gear is shifted from the 4th to the 3rd and to the 2nd with decrease in the speed, but when the instruction for start at the 2nd speed is given, and also when the load of the vehicle is small, the operation does not proceed to steps 17 to 19 for 2-1 shift, but circulates from 12 to 13-14-15-16-(A) and then to 12-13- . . .; and when the vehicle stops, the shift position is at the 2nd speed. At the time of next start, the instruction for start at the 2nd speed is given; when the load of the vehicle is small, the operation proceeds to the steps of rewriting tables after steps 10 and onward and to control of speed change through the flow of steps (V) to (W) and to X shown in FIG. 13a without setting the shift position to the 1st speed to cause starting at the 2nd speed.

Figure 14:
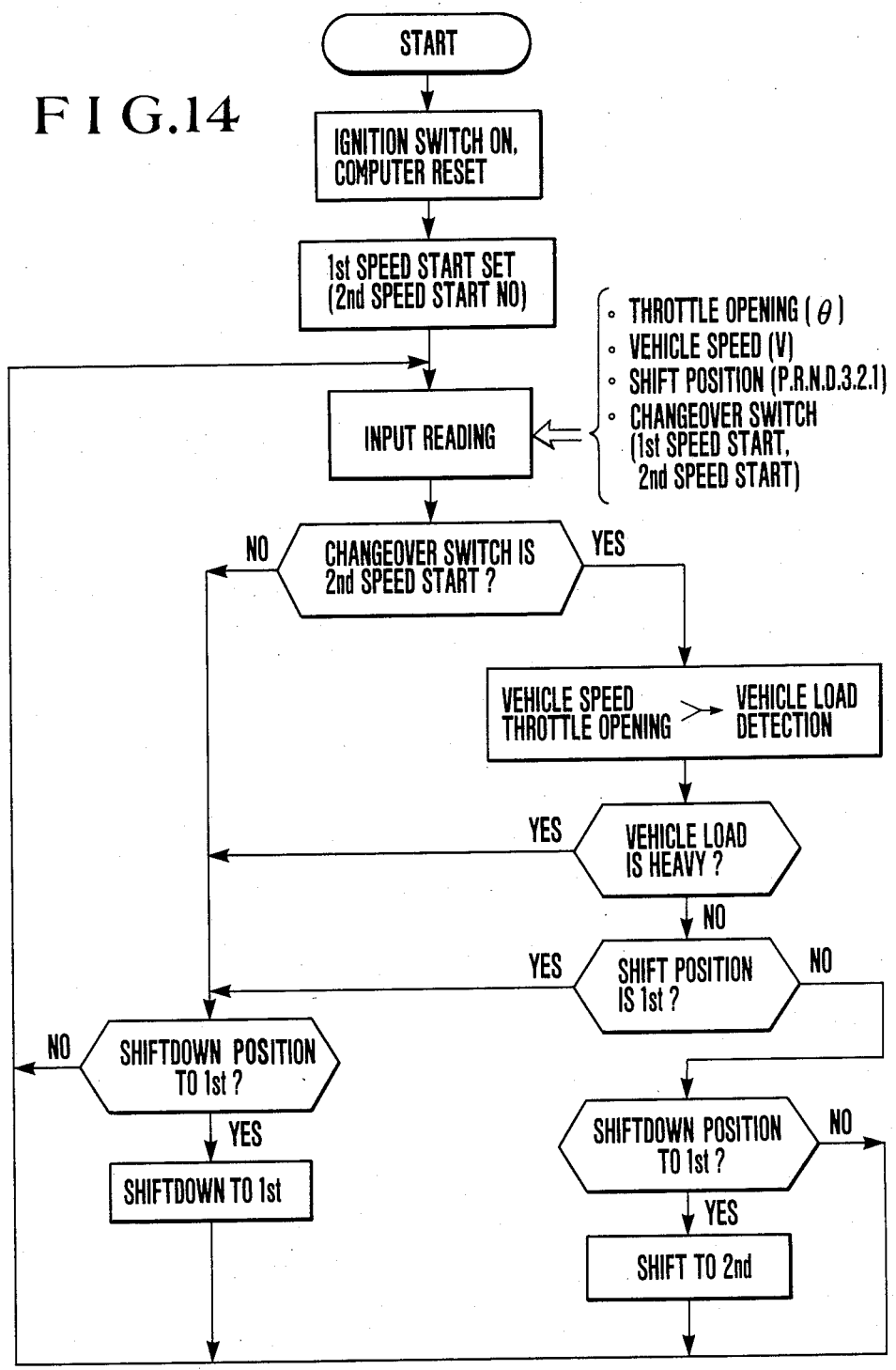
FIG. 14 is a flow chart showing only the outline of the 2nd gear speed start control system of the transmission control system.

FIG. 14 shows the summary of control of start at the 2nd speed. In short, in the case of the first start after power is turned on, the vehicle starts with its automatic transmission set at the 1st speed. After this, the condition of switches and sensors and the signals are read, and the speed change from a low to a high speed and vice versa is controlled depending on the setting and the conditions. When the switch 600 is closed, shiftdown to the 1st speed is made if conditions to permit shift to the 1st speed hold (For example, shiftdown from the 2nd to the 1st, or from the 3rd to the 1st). When the switch 600 is opened, and also when the load of the vehicle is small, the 2nd speed position is maintained even if the conditions to permit shift to the 1st gear speed hold, and shiftdown to the 1st speed is made only when the load of the vehicle is great. Because of this system, when the switch 600 is closed, and also when the load of the vehicle is small, the vehicle stops at the 2nd speed position. At the time of next start with the shift lever set at the 2nd speed, when switch 600 is closed, the vehicle starts at the 2nd speed.

The reason why the vehicle always starts at the 1st speed after the power is turned on is that the load of the vehicle has not been detected and judgment cannot be made as to whether or not starting at the second speed is possible.

When a means for storage such as a nonvolatile RAM which can maintain the memory even when the main power is turned off, the load of the vehicle detected last time can be maintained to enable start at the 2nd speed at the first start immediately after the main power is turned on. In any event, in the embodiment of the present invention, the load of the vehicle is detected before the vehicle stops, and the data of this load is used for judging whether or not start at the 2nd speed is possible for the next start.

As described in the foregoing, in the embodiment of the present invention, the load of the vehicle is detected while the vehicle is running, and the detected data is used in judging whether or not starting at the 2nd speed at the time of the start after the vehicle stopped once, so that the load of the vehicle can be detected relatively easily and accurately using a relatively small number of conventional detectors. Therefore, the present invention is not only readily applicable to the conventional transmission control system but also allows stable control of the transmission.

It should be understood that the preferred embodiments of the present invention have been described herein in considerable detail and that certain modifications, changes, and adaptations may be made therein by those skilled in the art and that it is hereby intended to cover all modification, changes and adaptations thereof falling within the scope of the appended claims.

What is claimed is:

1. A start controlling system for engine-driven vehicles having an automatic transmission for setting a gear ratio in accordance with a target speed stage calculated on the bases of engine throttle position, vehicle speed and vehicle load, comprising:

means for judging, during running of the vehicle, whether or not vehicle starting at a high gear ratio is allowable, for allowing starting at the high gear when a low vehicle load is detected, and for preventing starting at the high gear ratio when a high vehicle load is detected, means for setting the gear ratio at a time of stopping of the vehicle, setting a high gear ratio before stopping the vehicle when the vehicle starting at a high gear ratio is allowable and maintaining said high gear ratio during stopping of the vehicle, and means for starting the vehicle with said maintained high gear ratio.

2. A start controlling system for engine-driven vehicles of claim 1, wherein said means for setting the gear ratio at the time of stopping of the vehicle further comprises means for setting a high gear ratio at the time of stopping of the vehicle by maintaining a high gear ratio during running of the vehicle when starting of the vehicle at a high gear ratio is allowable, even if the vehicle speed becomes lower than a predetermined speed at which the gear ratio is ordinarily to be changed to a low gear ratio.

* * * * *